US010680733B2

(12) United States Patent
Su et al.

(10) Patent No.: US 10,680,733 B2
(45) Date of Patent: Jun. 9, 2020

(54) SERVICE MAPPING PROCESSING METHOD FOR OPTICAL TRANSPORT NETWORK, APPARATUS, AND SYSTEM

(71) Applicant: Huawei Technologies Co., Ltd., Shenzhen (CN)

(72) Inventors: Wei Su, Amsterdam (NL); Maarten Petrus Joseph Vissers, Amsterdam (NL); Qiuyou Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 272 days.

(21) Appl. No.: 15/465,299

(22) Filed: Mar. 21, 2017

(65) Prior Publication Data

US 2017/0195077 A1    Jul. 6, 2017

Related U.S. Application Data

(63) Continuation of application No. PCT/CN2015/082675, filed on Jun. 29, 2015.

(30) Foreign Application Priority Data

Sep. 22, 2014  (CN) .......................... 2014 1 0487469

(51) Int. Cl.
*H04J 3/16* (2006.01)
*H04B 10/27* (2013.01)
*H04L 12/46* (2006.01)

(52) U.S. Cl.
CPC ............ *H04J 3/1652* (2013.01); *H04B 10/27* (2013.01); *H04J 3/16* (2013.01); *H04L 12/4633* (2013.01)

(58) Field of Classification Search
None
See application file for complete search history.

(56) References Cited

U.S. PATENT DOCUMENTS 6,961,350 B1   11/2005  Bendak et al.
7,894,482 B1 *  2/2011  Wu ....................... H04J 3/1652
                                                              370/476
(Continued)

FOREIGN PATENT DOCUMENTS

CN          101489157 A     7/2009
CN          101635867 A     1/2010
(Continued)

OTHER PUBLICATIONS

Gorshe, Steve, A Tutorial on ITU-T G.709 Optical Transport Networks (OTN), 2009, PMC-Sierra, Inc. pp. 19-23, 45-46, and 54-56. (Year: 2009).*

(Continued)

*Primary Examiner* — Jai M Lee
(74) *Attorney, Agent, or Firm* — Leydig, Voit & Mayer, Ltd.

(57) ABSTRACT

A service mapping processing method for an optical transport network, an apparatus, and a system are provided, where the method includes: generating mapping adaptation indication information according to a mapping granularity of a to-be-carried LO ODU, where the mapping granularity is M×g bytes, M is a quantity of timeslots occupied by the to-be-carried LO ODU in an OPUCn, g is a size of a mapping granularity corresponding to each timeslot of the timeslots occupied by the LO ODU, and g is a positive integer greater than 1; mapping, according to the mapping adaptation indication information, the to-be-carried LO ODU to an ODTUCn.M payload area; encapsulating the mapping adaptation indication information into the ODTUCn.M overhead area; encapsulating the ODTUCn.M into an OTUCn; and sending the OTUCn to a receive end device. The method avoids that OTUCns that use different (Continued)

mapping granularities cannot interwork between a receive end and a transmit end.

4 Claims, 21 Drawing Sheets

(56) References Cited

U.S. PATENT DOCUMENTS

| | | | | |
|---|---|---|---|---|
| 9,025,619 | B2* | 5/2015 | Su | H04J 3/1652 370/466 |
| 2005/0286521 | A1* | 12/2005 | Chiang | H04J 3/1652 370/389 |
| 2008/0107418 | A1* | 5/2008 | Zhang | H04J 3/1611 398/98 |
| 2010/0142947 | A1 | 6/2010 | Shin et al. | |
| 2010/0158519 | A1* | 6/2010 | Dong | H04J 3/1652 398/45 |
| 2010/0209107 | A1 | 8/2010 | Yin | |
| 2010/0226652 | A1* | 9/2010 | Vissers | H04J 14/08 398/98 |
| 2010/0303464 | A1* | 12/2010 | Dong | H04J 3/1652 398/98 |
| 2011/0116793 | A1 | 5/2011 | Zhang et al. | |
| 2011/0217047 | A1 | 9/2011 | Dong et al. | |
| 2012/0002965 | A1* | 1/2012 | Bellato | H04J 3/1652 398/52 |
| 2012/0057870 | A1 | 3/2012 | Dong et al. | |
| 2012/0082455 | A1* | 4/2012 | Bardalai | H04J 3/1652 398/58 |
| 2012/0099862 | A1* | 4/2012 | Lin | H04J 3/1664 398/45 |
| 2012/0263475 | A1 | 10/2012 | Su et al. | |
| 2013/0259481 | A1* | 10/2013 | Suzuki | H04J 14/0227 398/66 |

FOREIGN PATENT DOCUMENTS

| | | |
|---|---|---|
| CN | 101742364 A | 6/2010 |
| CN | 101834688 A | 9/2010 |
| CN | 103825668 A | 5/2014 |
| EP | 2237457 A2 | 10/2010 |
| JP | 2010136380 A | 6/2010 |
| JP | 2010213271 A | 9/2010 |
| JP | 2014171248 A | 9/2014 |
| KR | 20110134463 A | 12/2011 |

OTHER PUBLICATIONS

Medhi, Von Neumann Architecture, 2012 (Year: 2012).*
Vissers et al., "Beyond 100G: Living list (Aug. 29, 2014)," WD11-26R3, XP044169662, pp. 1-60, (Aug. 25-29, 2014).
"Series G: Transmission Systems and Media, Digital Systems and Networks; Digital terminal equipments-General; Series Y: Global Information Infrastructure, Internet Protocol Aspects and Next-Generation Networks; Internet protocol aspects-Transport; Interfaces for the Optical Transport Network (OTN)," Recommendation ITU-T G.709/Y.1331, XP-002618904, International Telecommunication Union, Geneva, Switzerland (Dec. 2009).

* cited by examiner

FIG. 5A

| 25n+1 | 25n+2 | ... | 26n | 26n+1 | 26n+2 | ... | 27n | 27n+1 | 27n+2 | ... | 28n | ... | 35n+1 | 35n+2 | ... | 36n | ... |
|---|---|---|---|---|---|---|---|---|---|---|---|---|---|---|---|---|---|
| 10 | 20 | ... | 10n | 1 | 11 | ... | 10(n-1)+1 | 2 | 12 | ... | 10(n-1)+2 | ... | 10 | 20 | ... | 10n | ... |
| 10 | 20 | ... | 10n | 1 | 11 | ... | 10(n-1)+1 | 2 | 12 | ... | 10(n-1)+2 | ... | 10 | 20 | ... | 10n | ... |
| 10 | 20 | ... | 10n | 1 | 11 | ... | 10(n-1)+1 | 2 | 12 | ... | 10(n-1)+2 | ... | 10 | 20 | ... | 10n | ... |
| 10 | 20 | ... | 10n | 1 | 11 | ... | 10(n-1)+1 | 2 | 12 | ... | 10(n-1)+2 | ... | 10 | 20 | ... | 10n | ... |
| 10 | 20 | ... | 10n | 1 | 11 | ... | 10(n-1)+1 | 2 | 12 | ... | 10(n-1)+2 | ... | 10 | 20 | ... | 10n | ... |
| 10 | 20 | ... | 10n | 1 | 11 | ... | 10(n-1)+1 | 2 | 12 | ... | 10(n-1)+2 | ... | 10 | 20 | ... | 10n | ... |
| 10 | 20 | ... | 10n | 1 | 11 | ... | 10(n-1)+1 | 2 | 12 | ... | 10(n-1)+2 | ... | 10 | 20 | ... | 10n | ... |
| 10 | 20 | ... | 10n | 1 | 11 | ... | 10(n-1)+1 | 2 | 12 | ... | 10(n-1)+2 | ... | 10 | 20 | ... | 10n | ... |
| 10 | 20 | ... | 10n | 1 | 11 | ... | 10(n-1)+1 | 2 | 12 | ... | 10(n-1)+2 | ... | 10 | 20 | ... | 10n | ... |
| 10 | 20 | ... | 10n | 1 | 11 | ... | 10(n-1)+1 | 2 | 12 | ... | 10(n-1)+2 | ... | 10 | 20 | ... | 10n | ... |

FIG. 5B

| 3806n+1 | 3806n+2 | ... | 3807n | 3807n+1 | 3807n+2 | ... | 3808n | ... | 3815n+1 | 3815n+2 | ... | 3816n | 3816n+1 ... 3824n |
|---|---|---|---|---|---|---|---|---|---|---|---|---|---|
| 1 | 11 | ... | 10(n-1)+1 | 2 | 12 | ... | 10(n-1)+2 | ... | 10 | 20 | ... | 10n | |
| 1 | 11 | ... | 10(n-1)+1 | 2 | 12 | ... | 10(n-1)+2 | ... | 10 | 20 | ... | 10n | |
| 1 | 11 | ... | 10(n-1)+1 | 2 | 12 | ... | 10(n-1)+2 | ... | 10 | 20 | ... | 10n | |
| 1 | 11 | ... | 10(n-1)+1 | 2 | 12 | ... | 10(n-1)+2 | ... | 10 | 20 | ... | 10n | |
| 1 | 11 | ... | 10(n-1)+1 | 2 | 12 | ... | 10(n-1)+2 | ... | 10 | 20 | ... | 10n | |
| 1 | 11 | ... | 10(n-1)+1 | 2 | 12 | ... | 10(n-1)+2 | ... | 10 | 20 | ... | 10n | |
| 1 | 11 | ... | 10(n-1)+1 | 2 | 12 | ... | 10(n-1)+2 | ... | 10 | 20 | ... | 10n | |
| 1 | 11 | ... | 10(n-1)+1 | 2 | 12 | ... | 10(n-1)+2 | ... | 10 | 20 | ... | 10n | |
| 1 | 11 | ... | 10(n-1)+1 | 2 | 12 | ... | 10(n-1)+2 | ... | 10 | 20 | ... | 10n | |
| 1 | 11 | ... | 10(n-1)+1 | 2 | 12 | ... | 10(n-1)+2 | ... | 10 | 20 | ... | 10n | |

FIG. 5C

|  | 1 | 2 | 3 | 4 | 5 | 6 | 7 | 8 |
|---|---|---|---|---|---|---|---|---|
| PSI[2i] | Occupied | | | | | | | |
| PSI[2i+1] | | Tributary port | | | | | | |

SERVICE MAPPING PROCESSING METHOD FOR OPTICAL TRANSPORT NETWORK, APPARATUS, AND SYSTEM

CROSS-REFERENCE TO RELATED APPLICATIONS

This application is a continuation of International Application No. PCT/CN2015/082675, filed on Jun. 29, 2015, which claims priority to Chinese Patent Application No. 201410487469.2, filed on Sep. 22, 2014. The disclosures of the aforementioned applications are hereby incorporated by reference in their entireties.

TECHNICAL FIELD

Embodiments of the present disclosure relate to communications technologies, and in particular, to a service mapping processing method for an optical transport network, an apparatus, and a system.

BACKGROUND

An optical transport network (OTN) technology serves as a core technology of a next-generation transport network, and includes technical specifications of two aspects: an electrical layer and an optical layer. For electrical layer technical specifications, currently, the International Telecommunication Union Telecommunication Standardization Sector (ITU-T) has defined an OTN as a 4×4080 structure. However, to satisfy upper-layer Internet Protocol (IP) service transport with continuously increasing traffic, an electrical layer technology corresponding to the OTN also needs to provide a matched variable-rate OTN. At present, the ITU-T is discussing to develop a new optical channel transport unit Cn (OTUCn) with a rate that exceeds 100 Gbit/s. A bit rate of the OTUCn is n times a reference rate. The reference rate is preferably 100 Gbit/s, n is variable, and C is the Roman number 100. With emergence of the OTUCn, a generic mapping procedure (GMP) is used to map a low order (LO) optical channel data unit (ODU) to the OTUCn, and a mapping granularity is fixed at a quantity of timeslots, of an optical channel payload unit (OPU) in the OTUCn, occupied by the LO ODU.

However, in this method, use of a fixed mapping granularity is not flexible enough, which may cause a problem that OTUCns that carry a same LO ODU but use different mapping granularities cannot interwork between a receive end and a transmit end.

SUMMARY

Embodiments of the present disclosure provide a service mapping processing method for an optical transport network, an apparatus, and a system, so as to resolve a problem that OTUCns that use different mapping granularities cannot interwork between a receive end and a transmit end.

According to a first aspect, an embodiment of the present disclosure provides a service mapping processing method for an optical transport network, including:

generating mapping adaptation indication information according to a mapping granularity of a to-be-carried low order optical channel data unit LO ODU, where the mapping granularity is M×g bytes, M is a quantity of timeslots occupied by the to-be-carried LO ODU in an optical channel payload unit OPUCn, g is a size of a mapping granularity corresponding to each timeslot of the timeslots occupied by the LO ODU, and g is a positive integer greater than 1;

mapping the to-be-carried LO ODU to an ODTUCn.M payload area in an optical channel data tributary unit ODTUCn.M according to the mapping adaptation indication information, where the ODTUCn.M includes an ODTUCn.M overhead area and the ODTUCn.M payload area;

encapsulating the mapping adaptation indication information into the ODTUCn.M overhead area;

encapsulating the ODTUCn.M into an optical channel transport unit OTUCn; and sending the OTUCn to a receive end device.

With reference to the first aspect, in a first possible implementation manner of the first aspect, the mapping adaptation indication information includes: a mapping adaptation type, and the mapping adaptation type is used to indicate the size g of the mapping granularity corresponding to each timeslot of the timeslots occupied by the LO ODU.

With reference to the first possible implementation manner of the first aspect, in a second possible implementation manner of the first aspect, the mapping adaptation indication information further includes: a quantity $C_m$ of data entities that are of the to-be-carried LO ODU and are carried in the ODTUCn.M and clock information $C_{nD}$ of the to-be-carried LO ODU, where a size of the data entities is M×g bytes.

With reference to the second possible implementation manner of the first aspect, in a third possible implementation manner of the first aspect, the generating mapping adaptation indication information according to a mapping granularity of a to-be-carried low order optical channel data unit LO ODU includes:

obtaining by calculation, according to the quantity M of the timeslots occupied by the to-be-carried LO ODU in the OPUCn, the size g of the mapping granularity corresponding to each timeslot of the timeslots occupied by the LO ODU, and a quantity of bytes of the to-be-carried LO ODU transmitted in an ODTUCn.M period, the quantity $C_m$ of the data entities that are of the to-be-carried LO ODU and are carried in the ODTUCn.M; and obtaining by calculation the clock information $C_{nD}$ of the to-be-carried LO ODU according to the quantity M of the timeslots occupied by the to-be-carried LO ODU in the OPUCn, the size g of the mapping granularity corresponding to each timeslot of the timeslots occupied by the LO ODU, and the quantity of the bytes of the to-be-carried LO ODU transmitted in the ODTUCn.M period.

With reference to any one of the first aspect, or the first to the third possible implementation manners of the first aspect, in a fourth possible implementation manner of the first aspect, the method further includes:

generating another piece of mapping adaptation indication information according to a mapping granularity of another to-be-carried LO ODU, where the mapping granularity of the another LO ODU is $M_1 \times g_1$ bytes, $M_1$ is a quantity of timeslots occupied by the another LO ODU in the OPUCn, $g_1$ is a size of a mapping granularity corresponding to each timeslot of the timeslots occupied by the another LO ODU, and $g_1$ is a positive integer greater than 1, where $g_1$ is not equal to g;

mapping the another LO ODU to an ODTUCn.$M_1$ payload area according to the another piece of mapping adaptation indication information, where the ODTUCn.$M_1$ includes an ODTUCn.$M_1$ overhead area and the ODTUCn.$M_1$ payload area;

encapsulating the another piece of mapping adaptation indication information into the ODTUCn.M$_1$ overhead area; and encapsulating the ODTUCn.M$_1$ into the OTUCn.

With reference to any one of the first aspect, or the first to the fourth possible implementation manners of the first aspect, in a fifth possible implementation manner of the first aspect, the mapping granularity is configured by a network management system NMS or a transport software-defined network T-SDN controller.

According to a second aspect, an embodiment of the present disclosure provides a service mapping processing method for an optical transport network, including:

receiving an optical channel transport unit OTUCn sent by a transmit end device;

obtaining an optical channel data tributary unit ODTUCn.M from the OTUCn, where the ODTUCn.M includes an ODTUCn.M overhead area and an ODTUCn.M payload area;

determining a mapping granularity according to mapping adaptation indication information and a payload structure identifier PSI that are carried in the ODTUCn.M overhead area, where the mapping granularity is M×g bytes, M is a quantity of timeslots occupied by the to-be-carried LO ODU in an optical channel payload unit OPUCn, g is a size of a mapping granularity corresponding to each timeslot of the timeslots occupied by the LO ODU, and g is a positive integer greater than 1; and performing, according to the mapping adaptation indication information, demapping on the ODTUCn.M to obtain a low order optical channel data unit LO ODU.

With reference to the second aspect, in a first possible implementation manner of the second aspect, the mapping adaptation indication information includes: a mapping adaptation type, and the mapping adaptation type is used to indicate the size g of the mapping granularity corresponding to each timeslot of the timeslots occupied by the LO ODU.

With reference to the first possible implementation manner of the second aspect, in a second possible implementation manner of the second aspect, the mapping adaptation indication information further includes: a quantity $C_m$ of data entities that are of the to-be-carried LO ODU and are carried in the ODTUCn.M and clock information $C_{nD}$ of the to-be-carried LO ODU, where a size of the data entities is M×g bytes.

With reference to the second possible implementation manner of the second aspect, in a third possible implementation manner of the second aspect, the determining a mapping granularity according to mapping adaptation indication information and a payload structure identifier PSI that are carried in the ODTUCn.M overhead area includes:

obtaining, according to the mapping adaptation type in the mapping adaptation indication information, the size g of the mapping granularity corresponding to each timeslot of the timeslots occupied by the LO ODU; and obtaining, according to the PSI, the quantity M of the timeslots occupied by the to-be-carried LO ODU in the OPUCn.

With reference to the third possible implementation manner of the second aspect, in a fourth possible implementation manner of the second aspect, the performing, according to the mapping adaptation indication information, demapping on the ODTUCn.M to obtain a low order optical channel data unit LO ODU includes:

parsing the mapping adaptation indication information to obtain the quantity $C_m$ of data entities that are of the to-be-demapped LO ODU in the ODTUCn.M and are carried in the ODTUCn.M and the clock information $C_{nD}$ of the LO ODU;

obtaining, by demapping, the LO ODU from the ODTUCn.M according to the mapping granularity, the quantity $C_m$ of the data entities that are of the LO ODU and are carried in the ODTUCn.M, and a preset mapping algorithm;

obtaining by calculation, according to the mapping granularity, the quantity $C_m$ of the data entities that are of the LO ODU and are carried in the ODTUCn.M, and the clock information $C_{nD}$ of the LO ODU, a quantity of bytes of the LO ODU transmitted in an ODTUCn.M period; and restoring the clock information of the LO ODU according to the quantity of the bytes of the LO ODU transmitted in the ODTUCn.M period.

According to a third aspect, an embodiment of the present disclosure provides a transmit end apparatus, including:

an indication information generation module, configured to generate mapping adaptation indication information according to a mapping granularity of a to-be-carried low order optical channel data unit LO ODU, where the mapping granularity is M×g bytes, M is a quantity of timeslots occupied by the to-be-carried LO ODU in an optical channel payload unit OPUCn, g is a size of a mapping granularity corresponding to each timeslot of the timeslots occupied by the LO ODU, and g is a positive integer greater than 1;

a mapping module, configured to map the to-be-carried LO ODU to an ODTUCn.M payload area in an optical channel data tributary unit ODTUCn.M according to the mapping adaptation indication information, where the ODTUCn.M includes an ODTUCn.M overhead area and the ODTUCn.M payload area;

an encapsulation module, configured to encapsulate the mapping adaptation indication information into the ODTUCn.M overhead area and encapsulate the ODTUCn.M into an optical channel transport unit OTUCn; and a sending module, configured to send the OTUCn to a receive end apparatus.

With reference to the third aspect, in a first possible implementation manner of the third aspect, the mapping adaptation indication information includes: a mapping adaptation type, and the mapping adaptation type is used to indicate the size g of the mapping granularity corresponding to each timeslot of the timeslots occupied by the LO ODU.

With reference to the first possible implementation manner of the third aspect, in a second possible implementation manner of the third aspect, the mapping adaptation indication information further includes: a quantity $C_m$ of data entities that are of the to-be-carried LO ODU and are carried in the ODTUCn.M and clock information $C_{nD}$ of the to-be-carried LO ODU, where a size of the data entities is M×g bytes.

With reference to the second possible implementation manner of the third aspect, in a third possible implementation manner of the third aspect, the indication information generation module is specifically configured to obtain by calculation, according to the quantity M of the timeslots occupied by the to-be-carried LO ODU in the OPUCn, the size g of the mapping granularity corresponding to each timeslot of the timeslots occupied by the LO ODU, and a quantity of bytes of the to-be-carried LO ODU transmitted in an ODTUCn.M period, the quantity $C_m$ of the data entities that are of the to-be-carried LO ODU and are carried in the ODTUCn.M; and obtain by calculation the clock information $C_{nD}$ of the to-be-carried LO ODU according to the quantity M of the timeslots occupied by the to-be-carried LO ODU in the OPUCn, the size g of the mapping granularity corresponding to each timeslot of the timeslots occupied by the LO ODU, and the quantity of the bytes of the to-be-carried LO ODU transmitted in the ODTUCn.M period.

With reference to any one of the third aspect, or the first to the third possible implementation manners of the third aspect, in a fourth possible implementation manner of the third aspect, the indication information generation module is further configured to generate another piece of mapping adaptation indication information according to a mapping granularity of another to-be-carried LO ODU, where the mapping granularity of the another LO ODU is $M_1 \times g_1$ bytes, $M_1$ is a quantity of timeslots occupied by the another LO ODU in the OPUCn, $g_1$ is a size of a mapping granularity corresponding to each timeslot of the timeslots occupied by the another LO ODU, and $g_1$ is a positive integer greater than 1, where $g_1$ is not equal to g;

the mapping module is further configured to map the another LO ODU to an ODTUCn.$M_1$ payload area according to the another piece of mapping adaptation indication information, where the ODTUCn.$M_1$ includes an ODTUCn.$M_1$ overhead area and the ODTUCn.$M_1$ payload area; and the encapsulation module is further configured to encapsulate the another piece of mapping adaptation indication information into the ODTUCn.$M_1$ overhead area; and encapsulate the ODTUCn.$M_1$ into the OTUCn.

With reference to any one of the third aspect, or the first to the fourth possible implementation manners of the third aspect, in a fifth possible implementation manner of the third aspect, the mapping granularity is configured by a network management system NMS or a transport software-defined network T-SDN controller.

According to a fourth aspect, an embodiment of the present disclosure provides a receive end apparatus, including:

a receiving module, configured to receive an optical channel transport unit OTUCn sent by a transmit end device;

an obtaining module, configured to obtain an optical channel data tributary unit ODTUCn.M from the OTUCn, where the ODTUCn.M includes an ODTUCn.M overhead area and an ODTUCn.M payload area;

a determining module, configured to determine a mapping granularity according to mapping adaptation indication information and a payload structure identifier PSI that are carried in the ODTUCn.M overhead area, where the mapping granularity is M×g bytes, M is a quantity of timeslots occupied by the to-be-carried LO ODU in an optical channel payload unit OPUCn, g is a size of a mapping granularity corresponding to each timeslot of the timeslots occupied by the LO ODU, and g is a positive integer greater than 1; and a demapping module, configured to perform, according to the mapping adaptation indication information, demapping on the ODTUCn.M to obtain a low order optical channel data unit LO ODU.

With reference to the fourth aspect, in a first possible implementation manner of the fourth aspect, the mapping adaptation indication information includes: a mapping adaptation type, and the mapping adaptation type is used to indicate the size g of the mapping granularity corresponding to each timeslot of the timeslots occupied by the LO ODU.

With reference to the first possible implementation manner of the fourth aspect, in a second possible implementation manner of the fourth aspect, the mapping adaptation indication information further includes: a quantity $C_m$ of data entities that are of the to-be-carried LO ODU and are carried in the ODTUCn.M and clock information $C_{nD}$ of the to-be-carried LO ODU, where a size of the data entities is M×g bytes.

With reference to the second possible implementation manner of the fourth aspect, in a third possible implementation manner of the fourth aspect, the determining module is specifically configured to obtain, according to the mapping adaptation indication information, the size g of the mapping granularity corresponding to each timeslot of the timeslots occupied by the LO ODU; and obtain, according to the PSI, the quantity M of the timeslots occupied by the to-be-carried LO ODU in the OPUCn.

With reference to the third possible implementation manner of the fourth aspect, in a fourth possible implementation manner of the fourth aspect, the demapping module is specifically configured to parse the mapping adaptation indication information to obtain the quantity $C_m$ of data entities that are of the to-be-demapped LO ODU in the ODTUCn.M and are carried in the ODTUCn.M and the clock information $C_{nD}$ of the LO ODU; obtain, by demapping, the LO ODU from the ODTUCn.M according to the mapping granularity, the quantity $C_m$ of the data entities that are of the LO ODU and are carried in the ODTUCn.M, and a preset mapping algorithm; obtain by calculation, according to the mapping granularity, the quantity $C_m$ of the data entities that are of the LO ODU and are carried in the ODTUCn.M, and the clock information $C_{nD}$ of the LO ODU, a quantity of bytes of the LO ODU transmitted in an ODTUCn.M period; and restore the clock information of the LO ODU according to the quantity of the bytes of the LO ODU transmitted in the ODTUCn.M period.

According to a fifth aspect, an embodiment of the present disclosure provides an optical transport network, including: a transmit end apparatus and a receive end apparatus, where the transmit end apparatus is the apparatus according to any one of the third aspect, or the first to the fifth possible implementation manners of the third aspect, and the receive end apparatus is the apparatus according to any one of the fourth aspect, or the first to the fourth possible implementation manners of the fourth aspect.

It should be noted that, mapping of an LO ODU described in the embodiments of the present disclosure means that an LO ODU signal is filled in a timeslot occupied by the LO ODU. This kind of mapping is not implemented at one time. Generally, multiple times of mapping are required to fill a to-be-carried LO ODU signal in the timeslot occupied by the to-be-carried LO ODU. In processes of the multiple times of mapping, a quantity of bytes of the LO ODU signal mapped in each mapping process is referred to as a mapping granularity of the LO ODU. Because one LO ODU signal may occupy multiple timeslots, a quantity of bytes mapped into each occupied timeslot is the same in each mapping process. The quantity of the bytes mapped into a single timeslot in each mapping process is referred to as a mapping granularity corresponding to a single timeslot of the timeslots occupied by the LO ODU.

According to the service mapping processing method for an optical transport network, and the apparatus and the system in the embodiments of the present disclosure, a mapping granularity is determined and mapping adaptation indication information is generated according to the mapping granularity, to instruct a receive end device to perform corresponding demapping. This implements mapping granularity-based mapping from an LO ODU to an ODTUCn.M, and resolves a problem in an existing situation with a fixed mapping granularity that OTUCns that carry a same LO ODU but use different mapping granularities cannot interwork between a receive end and a transmit end.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

FIG. 5A to FIG. 5C are a schematic diagram of timeslot division of an OPUCn overhead area and an OPUCn payload area;

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure.

Figure 1:
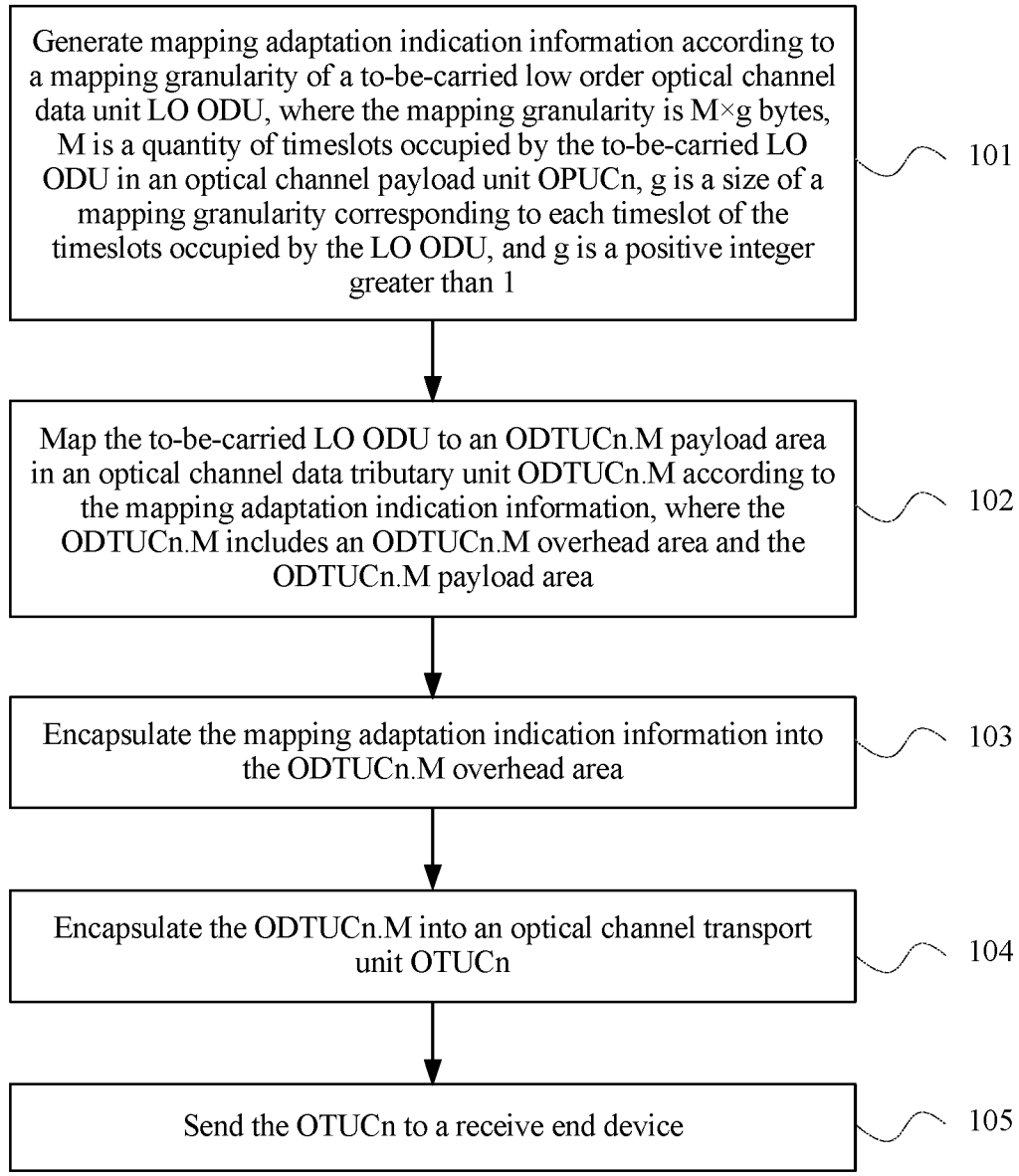
FIG. 1 is a flowchart of an embodiment of a service mapping processing method for an optical transport network according to the present disclosure.

FIG. 1 is a flowchart of an embodiment of a service mapping processing method for an optical transport network according to the present disclosure. As shown in FIG. 1, the method in this embodiment may include the following steps.

Step 101: Generate mapping adaptation indication information according to a mapping granularity of a to-be-carried low order optical channel data unit LO ODU, where the mapping granularity is M×g bytes, M is a quantity of timeslots occupied by the to-be-carried LO ODU in an optical channel payload unit OPUCn, g is a size of a mapping granularity corresponding to each timeslot of the timeslots occupied by the LO ODU, and g is a positive integer greater than 1.

This embodiment may be executed by a transmit end device in an OTN. At present, an OTUCn that is being discussed to develop by the ITU-T may indicate a rate that exceeds 100 Gbit/s, and a bit rate of the OTUCn is n times a reference rate, where n is variable, and C is a Roman number 100. With emergence of the OTUCn, the LO ODU needs to be mapped to the OTUCn. For the current chip, an optimal mapping granularity corresponding to a processing capability of bandwidth of a single OPUCn timeslot is 4 bytes ($C_{32}$) or 8 bytes ($C_{64}$). With further improvement of a chip processing capability and an increase of a rate indicated by the OTUCn, the mapping granularity becomes smaller, and a case with 2 bytes ($C_{16}$), 1 byte ($C_8$), or the like may occur. To avoid a case in which a receive end and a transmit end cannot interwork because of different mapping granularities, the mapping adaptation indication information needs to be generated according to the mapping granularity of the to-be-carried LO ODU, and the mapping granularity is variable. The mapping granularity g corresponding to a single OPUCn timeslot occupied by the to-be-carried LO ODU may be selected from $C_{64}$, $C_{32}$, $C_{16}$, $C_8$, and the like according to an actual situation, and the mapping granularity of the LO ODU is further determined by calculation according to the quantity M of the timeslots occupied by the to-be-carried LO ODU in the OPUCn, and the mapping granularity of the LO ODU is M×g bytes. The mapping adaptation indication information is mainly used by the transmit end device to indicate to a receive end device mapping information from the LO ODU to the OTUCn.

Step 102: Map the to-be-carried LO ODU to an ODTUCn.M payload area in an optical channel data tributary unit ODTUCn.M according to the mapping adaptation indication information, where the ODTUCn.M includes an ODTUCn.M overhead area and the ODTUCn.M payload area.

The transmit end device maps the to-be-carried LO ODU to the ODTUCn.M according to the mapping adaptation indication information, where the ODTUCn.M includes some timeslots in the OPUCn and timeslot overheads of the timeslots, and the ODTUCn.M carries LO ODU data. The ODTUCn.M overhead area carries the mapping adaptation indication information, and the ODTUCn.M payload area carries the LO ODU data. A receive end may obtain, by demapping, the LO ODU data from the ODTUCn.M payload area after parsing the mapping adaptation indication information carried in the ODTUCn.M overhead area.

Step 103: Encapsulate the mapping adaptation indication information into the ODTUCn.M overhead area.

Step 104: Encapsulate the ODTUCn.M into an optical channel transport unit OTUCn.

Because the ODTUCn.M includes some timeslots in the OPUCn and the timeslot overheads of the timeslots, the transmit end device separately encapsulates, when encapsulating the ODTUCn.M into the OPUCn, the ODTUCn.M into corresponding timeslots of the OPUCn, and then adds an ODUCn overhead, an OTUCn overhead, and a frame header indication to form an OTUCn frame.

Step 105: Send the OTUCn to a receive end device.

The transmit end device sends an encapsulated OTUCn to the receive end device. In this case, the OTUCn carries the LO ODU data. A mapping process is based on a variable mapping granularity; therefore, after receiving the OTUCn, the receive end device may learn, according to the mapping adaptation indication information, which timeslot of the OPUCn carries the LO ODU, so as to demap the LO ODU. In addition, the mapping granularity is also indicated in the mapping adaptation indication information, and the receive end device may perform demapping in a manner corresponding to the mapping granularity, thereby avoiding a problem that OTUCns that use different mapping granularities cannot interwork between a receive end and a transmit end.

According to this embodiment, a mapping granularity is determined and mapping adaptation indication information is generated according to the mapping granularity, to instruct a receive end device to perform corresponding demapping. This implements mapping granularity-based mapping from an LO ODU to an ODTUCn.M, and resolves a problem in an existing situation with a fixed mapping granularity that OTUCns that carry a same LO ODU but use different mapping granularities cannot interwork between a receive end and a transmit end.

Further, the mapping adaptation indication information includes: a mapping adaptation type, where the mapping adaptation type is used to indicate the size g of the mapping granularity corresponding to each timeslot of the timeslots occupied by the LO ODU.

Further, the mapping adaptation indication information further includes: a quantity $C_m$ of data entities that are of the to-be-carried LO ODU and are carried in the ODTUCn.M and clock information $C_{nD}$ of the to-be-carried LO ODU, where a size of the data entities is M×g bytes.

Further, a specific implementation method of the foregoing step 101 may be: obtaining by calculation, according to the quantity M of the timeslots occupied by the to-be-carried LO ODU in the OPUCn, the size g of the mapping granularity corresponding to each timeslot of the timeslots occupied by the LO ODU, and a quantity of bytes of the to-be-carried LO ODU transmitted in an ODTUCn.M period, the quantity $C_m$ of the data entities that are of the to-be-carried LO ODU and are carried in the ODTUCn.M; and obtaining by calculation the clock information $C_{nD}$ of the to-be-carried LO ODU according to the quantity M of the timeslots occupied by the to-be-carried LO ODU in the OPUCn, the size g of the mapping granularity corresponding to each timeslot of the timeslots occupied by the LO ODU, and the quantity of the bytes of the to-be-carried LO ODU transmitted in the ODTUCn.M period.

Further, the method further includes: generating another piece of mapping adaptation indication information according to a mapping granularity of another to-be-carried LO ODU, where the mapping granularity of the another LO ODU is $M_1 \times g_1$ bytes, $M_1$ is a quantity of timeslots occupied by the another LO ODU in the OPUCn, $g_1$ is a size of a mapping granularity corresponding to each timeslot of the timeslots occupied by the another LO ODU, and $g_1$ is a positive integer greater than 1, where $g_1$ is not equal to g; mapping the another LO ODU to an ODTUCn.$M_1$ payload area according to the another piece of mapping adaptation indication information, where the ODTUCn.$M_1$ includes an ODTUCn.$M_1$ overhead area and the ODTUCn.$M_1$ payload area; encapsulating the another piece of mapping adaptation indication information into the ODTUCn.$M_1$ overhead area; and encapsulating the ODTUCn.$M_1$ into the OTUCn.

Specifically, the transmit end device maps, according to the quantity M of timeslots occupied by each to-be-carried LO ODU in the OPUCn and the size g of the mapping granularity corresponding to each timeslot of the timeslots occupied by the LO ODU, by using a preset mapping algorithm, and in the size g of the mapping granularity corresponding to each to-be-carried LO ODU, each to-be-carried LO ODU to ODTUCn.M payload areas of a quantity the same as the quantity $C_m$ of the data entities that are of the to-be-carried LO ODU and are carried in the ODTUCn.M. In a mapping process, clock information $C_{nD}$ of each to-be-carried LO ODU is the same. If any two to-be-carried LO ODUs have a same rate, for example, both rates are ODU2, the quantities M of the timeslots occupied by the two to-be-carried LO ODUs are the same. However, the mapping granularity g corresponding to a single timeslot may be different. If any two to-be-carried LO ODUs have different rates, for example, one is ODU2, and the other is ODU3, neither quantities M of the timeslots occupied by the two to-be-carried LO ODUs nor a mapping granularity g corresponding to a single timeslot is the same.

Therefore, the transmit end device in this embodiment may further generate the another piece of mapping adaptation indication information according to the mapping granularity of the another LO ODU, where the mapping adaptation indication information and the mapping granularity of the LO ODU are in a one-to-one correspondence, and the quantity M of the timeslots occupied by the another LO ODU in the OPUCn and the size g of the mapping granularity corresponding to each timeslot of the timeslots occupied by the another LO ODU also correspond to the LO ODU. Finally, all ODTUCn.Ms formed by mapping the LO ODU are encapsulated into a same OTUCn. In this case, one OTUCn can carry LO ODUs of multiple services, multiple rates, and multiple mapping granularities.

Further, the mapping granularity is configured by a network management system NMS or a transport software-defined network T-SDN controller.

Figure 2A:
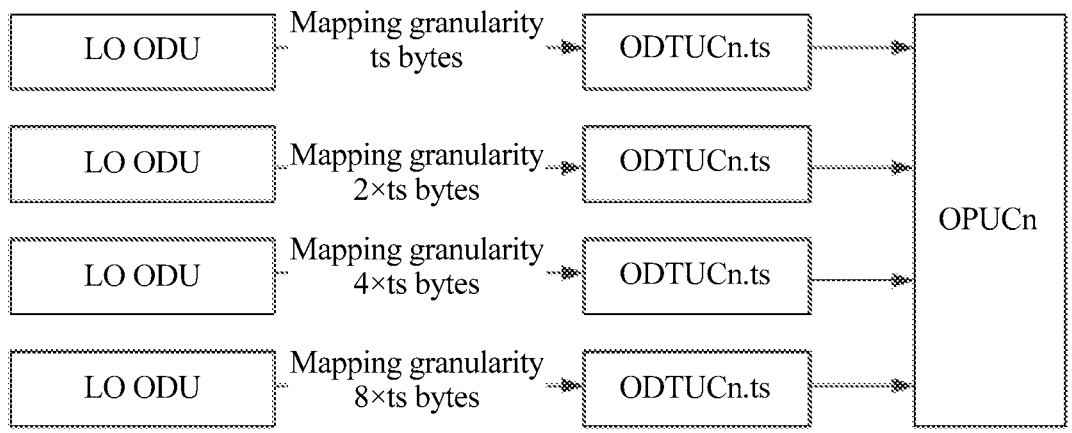
FIG. 2A is a schematic diagram of mapping of an LO ODU service with multiple mapping granularities to an OTUCn.
Figure 2B:
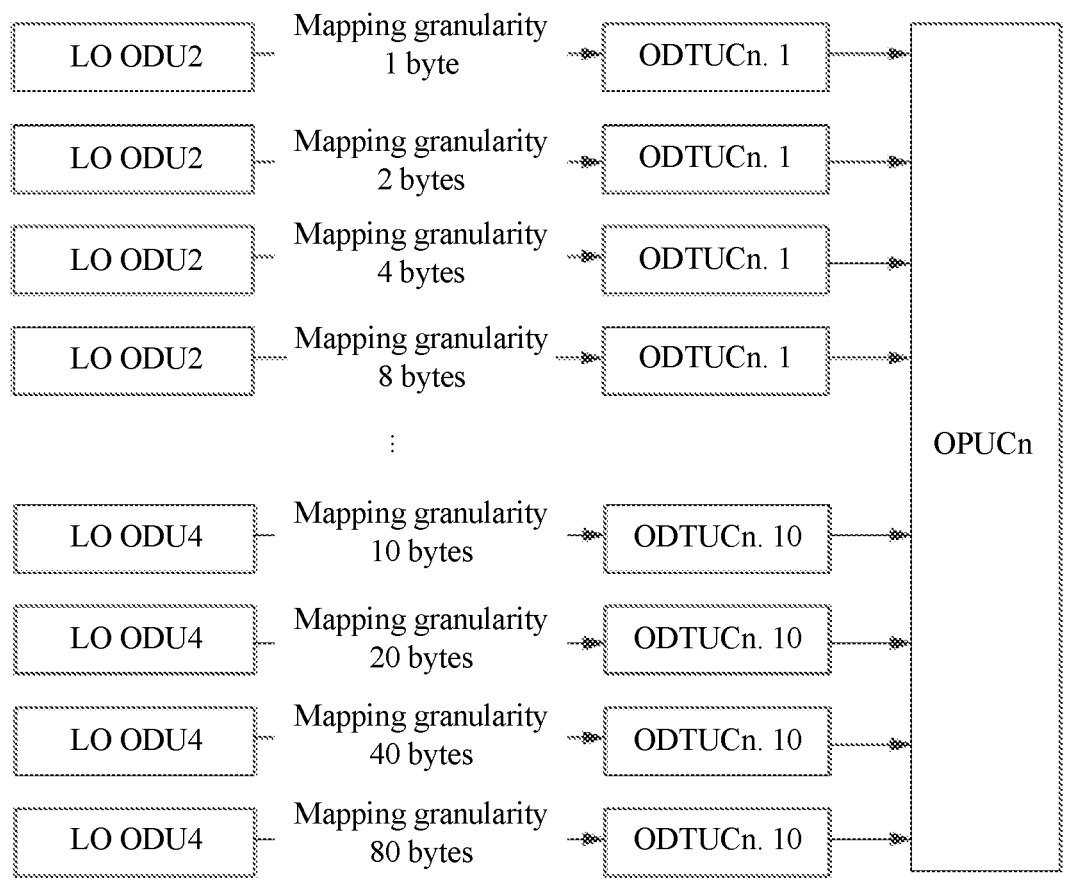
FIG. 2B is another schematic diagram of mapping of an LO ODU service with multiple mapping granularities to an OTUCn.

FIG. 2A is a schematic diagram of mapping of an LO ODU service with multiple mapping granularities to an OTUCn, and FIG. 2B is another schematic diagram of mapping of an LO ODU service with multiple mapping granularities to an OTUCn. According to a quantity M of timeslots occupied by each to-be-carried LO ODU in an OPUCn and a size g of a mapping granularity corresponding to each timeslot of the timeslots occupied by the LO ODU, by using a preset mapping algorithm, and in the size g of the mapping granularity corresponding to each to-be-carried LO ODU, each to-be-carried LO ODU is mapped to ODTUCn.M payload areas of a quantity the same as a quantity $C_m$ of data entities that are of the to-be-carried LO ODU and are carried in the ODTUCn.M. In a mapping process, clock information $C_{nD}$ of each to-be-carried LO ODU is the same. If any two to-be-carried LO ODUs have a same rate, for example, both rates are ODU2, the quantities M of the timeslots occupied by the two to-be-carried LO ODUs are the same. However, the mapping granularity g corresponding to a single timeslot may be different. If any two to-be-carried LO ODUs have different rates, for example, one is ODU2, and the other is ODU3, neither the quantities M of the timeslots occupied by the two to-be-carried LO ODUs nor the mapping granularity g corresponding to a single timeslot is the same. As shown in FIG. 2A and FIG. 2B, each of LO ODUs uses a different mapping granularity M×g bytes. In FIG. 2A, the LO ODUs of different mapping granularities are mapped to ODTUCn.M payload areas of a quantity the same as the quantity M of timeslots. In this example, M is ts, and g is 1 byte, 2 bytes, 4 bytes, and 8 bytes. In FIG. 2B, LO ODUs of different mapping granularities are mapped to ODTUCn.M payload areas of a quantity the same as the quantity M of timeslots. In this example, M is 1 to 10, and g is 1 byte, 2 bytes, 4 bytes, and 8 bytes. These LO ODUs of different mapping granularities may be mapped to different timeslots of the OTUCn by using a preset mapping algorithm, that is, the LO ODUs of different mapping granularities are carried in the OTUCn according to timeslot division. Each timeslot corresponds to one piece of mapping adaptation indication information, and a transmit end device needs only to indicate a timeslot overhead status corresponding to the transmit end device in the mapping adaptation indication information, and then may instruct a receive end device to perform demapping processing in a corresponding timeslot. The LO ODUs of different mapping granularities are finally mapped to ODTUCn.Ms divided by using a timeslot, and a case that interworking cannot be implemented due to different mapping granularities does not occur.

Figure 3:
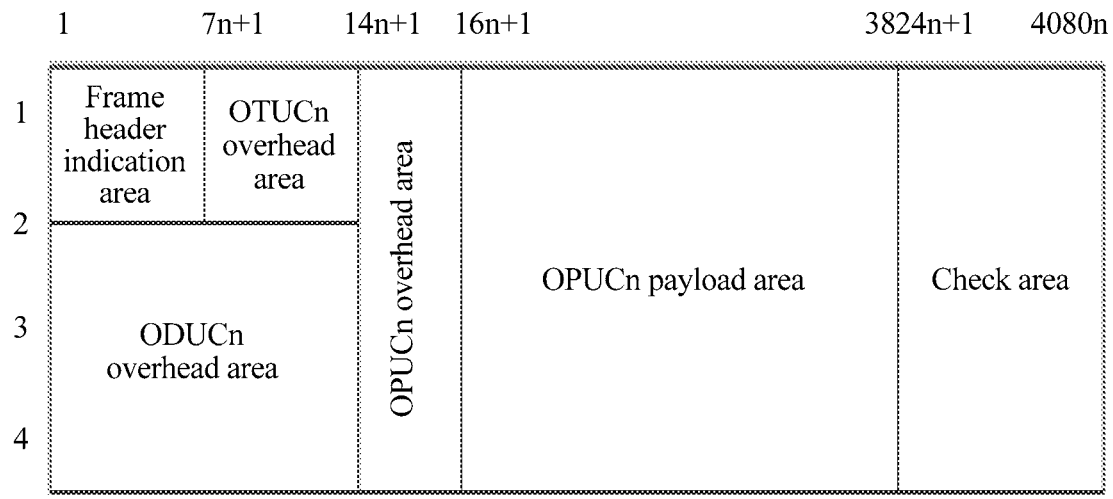
FIG. 3 is a schematic diagram of a frame structure of an OTUCn.
Figure 4:
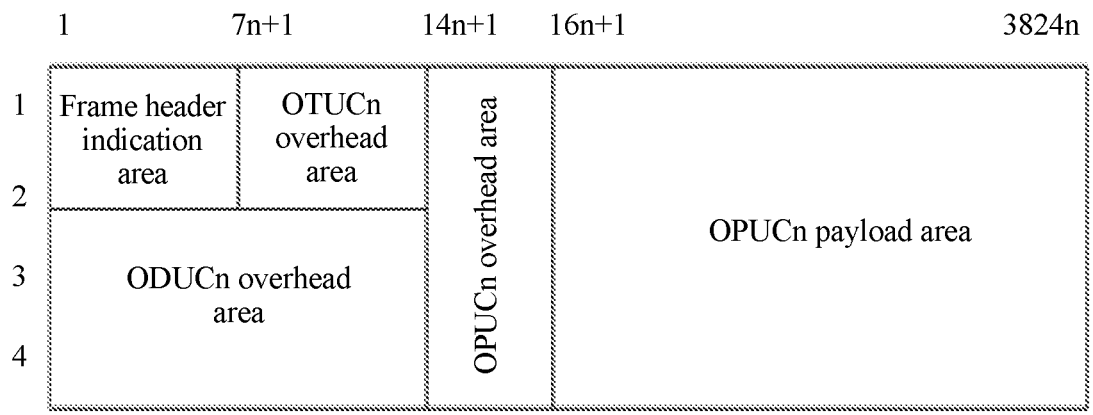
FIG. 4 is a schematic diagram of another frame structure of an OTUCn.

A frame structure of the OTUCn in the present disclosure may have two cases: one is that the frame structure of the OTUCn includes a forward error correction (FEC) check area. FIG. 3 is a schematic diagram of a frame structure of an OTUCn. As shown in FIG. 3, the frame structure is 4 rows×4080n columns, where the $1^{st}$ to the $7n^{th}$ columns of the $1^{st}$ row is a frame header indication area, the $(7n+1)^{th}$ to the $14n^{th}$ columns of the $1^{st}$ row is an OTUCn overhead area, the $1^{st}$ to the $14n^{th}$ columns of the $2^{nd}$ to the $4^{th}$ rows is an ODUCn overhead area, the $(14n+1)^{th}$ to the $16n^{th}$ columns of the $1^{st}$ to the $4^{th}$ rows is an OPUCn overhead area, the $(16n+1)^{th}$ to the $3824n^{th}$ columns of the $1^{st}$ to the $4^{th}$ rows is an OPUCn payload area, and the $(3824n+1)^{th}$ to the $4080n^{th}$ columns of the $1^{st}$ to the $4^{th}$ rows is a check area. The other is that the frame structure of the OTUCn does not have the FEC check area. FIG. 4 is a schematic diagram of another frame structure of an OTUCn. As shown in FIG. 4, the frame structure is 4 rows×3824n columns, where the $1^{st}$ to the $7n^{th}$ columns of the $1^{st}$ row is a frame header indication area, the $(7n+1)^{th}$ to the $14n^{th}$ columns of the $1^{st}$ row is an OTUCn overhead area, the $1^{st}$ to the $14n^{th}$ columns of the $2^{nd}$ to the $4^{th}$ rows is an ODUCn overhead area, the $(14n+1)^{th}$ to the $16n^{th}$ columns of the $1^{st}$ to the $4^{th}$ rows is an OPUCn overhead area, and the $(16n+1)^{th}$ to the $3824n^{th}$ columns of the $1^{st}$ to the $4^{th}$ rows is an OPUCn payload area. Introduction of the OTUCn makes an OTN line interface flexible, and an interface rate varies with a change of n.

Further, the OPUCn payload area in the present disclosure includes a payload area of timeslots of a first quantity, and the OPUCn overhead area is used to carry overhead information, where the overhead information includes mapping adaptation indication information, a payload structure identifier PSI, and an OPU multi-frame identifier OMFI, and the overhead information corresponds to the timeslots of the first quantity. The OPUCn overhead area includes an overhead area of timeslots of a first quantity. Overhead information carried in each overhead area corresponds to one timeslot, mapping adaptation indication information in each piece of overhead information occupies 6 bytes, a quantity of data entities that are of a to-be-carried LO ODU and are carried in an ODTUCn.M and clock information of the to-be-carried LO ODU respectively occupy 3 bytes of the 6 bytes, and a mapping adaptation type is carried in the 3 bytes occupied by the clock information of the to-be-carried LO ODU.

The following describes the technical solution of the method embodiment shown in FIG. 1 in detail with reference to a specific embodiment.

Figure 5A:
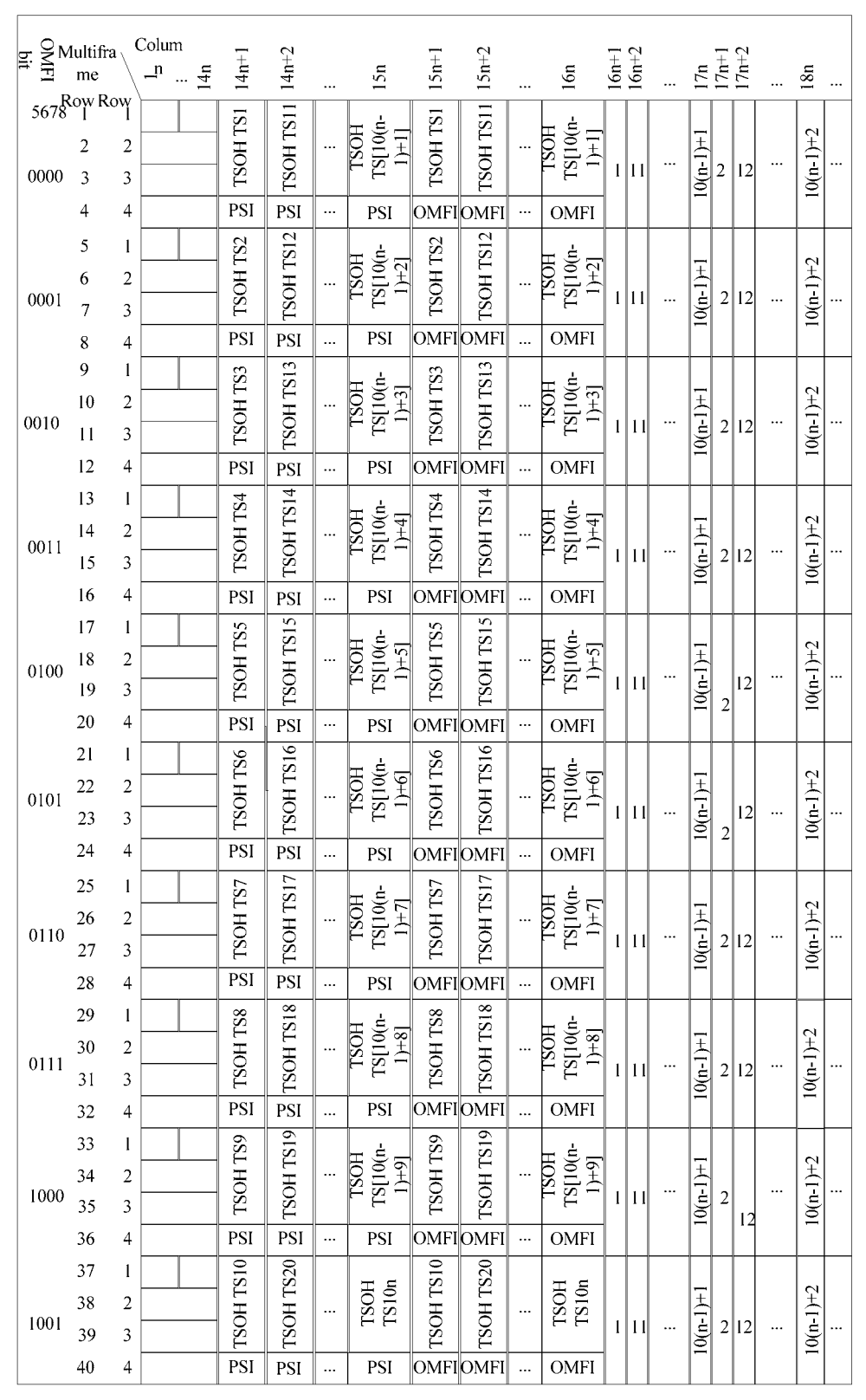

FIG. 5A to FIG. 5C are schematic diagrams of timeslot division of an OPUCn overhead area and an OPUCn payload area. As shown in FIG. 5A to FIG. 5C, the OPUCn payload area includes a payload area of 10n timeslots, and the OPUCn overhead area is used to carry overhead information, where the overhead information includes mapping adaptation indication information, a payload structure identifier (PSI), and an OPU multi-frame identifier (OMFI), where the overhead information corresponds to the 10n timeslots. The OPUCn overhead area includes an overhead area of 10n timeslots. Overhead information carried in each overhead area corresponds to one timeslot in the OPUCn payload area, mapping adaptation indication information in each piece of overhead information occupies 6 bytes, a quantity of data entities that are of a to-be-carried LO ODU and are carried in an ODTUCn.M and clock information of the to-be-carried LO ODU respectively occupy 3 bytes of the 6 bytes, and a mapping adaptation type is carried in the 3 bytes occupied by the clock information of the to-be-carried LO ODU.

In this example, 10 OPUCns form a 10-OPUCn multiframe, where the multiframe includes 40 rows×3824n columns, the OPUCn payload area is the $(16n+1)^{th}$ to the $3816n^{th}$ columns, and is divided into 10n 10 Gbit/s timeslots according to column spacing, the timeslots are numbered 1 to 10n, and each timeslot includes 40 rows×380 columns; the OPUCn overhead area is the $(14n+1)^{th}$ to the $16n^{th}$ columns, there are 2n columns in total, and every four rows is one frame; therefore, one 10-OPUCn multiframe includes 10 frames of OPUCn overhead areas, where (the $1^{st}$ to the $3^{rd}$ rows)×(the $(14n+1)^{th}$ to the $15n^{th}$ columns) of each frame and (the $1^{st}$ to the $3^{rd}$ rows)×(the $(15n+1)^{th}$ to the $16n^{th}$ columns) of each frame are timeslot (Tributary Slot, or "TS") overheads (OH), there are 20n TSOHs in total, two TSOHs correspond to one timeslot, and the TSOH in the present disclosure carries the mapping adaptation indication information; the $4^{th}$ row×(the $(14n+1)^{th}$ to the $15n^{th}$ columns) is the PSI, where the PSI is used to indicate a situation in which timeslots of the OPUCn are occupied by an ODTUCn.ts, the $4^{th}$ row×(the $(15n+1)^{th}$ to the $16n^{th}$ columns) of each frame is the OMFI, there are 10n PSIs and 10n OMFIs in total, and the PSIs and the timeslots are in a one-to-one correspondence. Overheads corresponding to each timeslot occur once every ten OPUCn frames (that is, the timeslot overheads corresponding to each timeslot in a 10-OPUCn frame occur only once), and the OPUCn is identified by using 5 to 8 bits (a value of the OMFI is 0 to 9, and is successively cycled) in the OMFI. A value of the OMFI in a transmit end device successively increases in unit of an OPUCn, and is counted from 0 to 9 and then to 0 again, which is successively cycled. OPUCns of 0 to 9 form one 10-OPUCn multiframe, and a receive end device may identify the OPUCn according to the OMFI.

If 10 (j−1)+i is used to indicate a timeslot number (j is 1 to n, and i is 1 to 10), a TSOH corresponding to the timeslot number is located in the $1^{st}$ to the $3^{rd}$ rows of the $(14n+j)^{th}$ column and the $(15n+j)^{th}$ column of the $i^{th}$ OPUCn. The TSOHs corresponding to one timeslot have 6 bytes in total, where the 6 bytes are respectively marked as J1, J2, J3, J4, J5, and J6. For example, for a TS11 (j=2, i=1), an overhead of the TS11 is located in the $1^{st}$ to the $3^{rd}$ rows of the $(14n+2)^{th}$ column and the $(15n+2)^{th}$ column of the $1^{st}$ OPUCn. The $(3816n+1)^{th}$ to the $3824n^{th}$ column is a filling area.

Figure 6A:
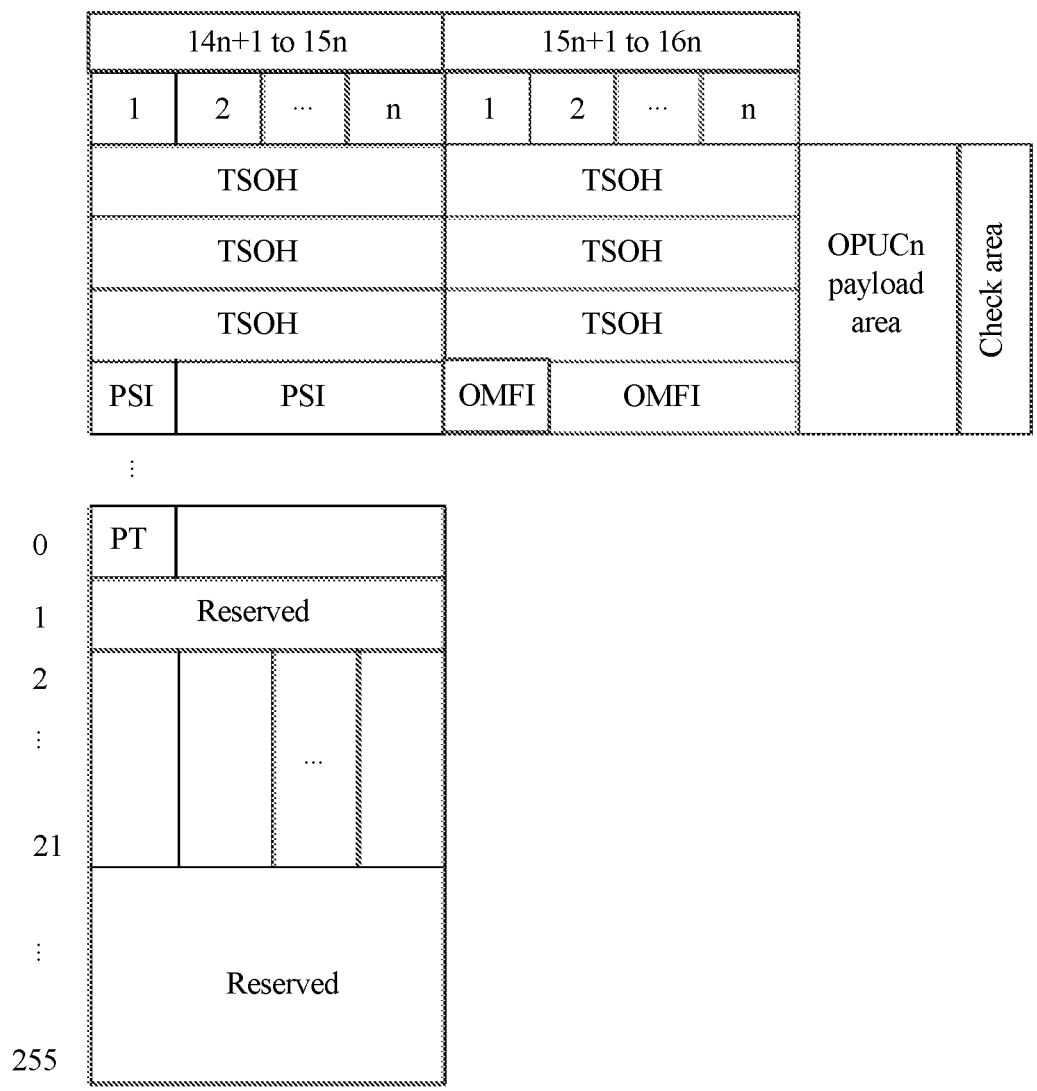
FIG. 6A is a schematic diagram of an OPUCn overhead area.

FIG. 6A is a schematic diagram of an OPUCn overhead area. As shown in FIG. 6A, a PSI may indicate that an ODTUCn.ts includes which is timeslots in a 10-OPUCn multiframe and timeslot overheads corresponding to the timeslots. The PSI is located in the $(14n+1)^{th}$ to the $15n^{th}$ columns of the $4^{th}$ row of each group, and separately indicates an allocation situation of 10n timeslots, where PSI [2] to PSI [21] of the $(14n+1)^{th}$ column indicates timeslots 1 to 10, PSI [2] to PSI [21] of the $(14n+2)^{th}$ column indicates timeslots 11 to 20, and then by analogy, PSI [2] to PSI [21] of the $15n^{th}$ column indicates timeslots (10n−9) to 10n. The 5 to 8 bits (the value of the OMFI is 0 to 9, and is successively cycled) in the OMFI identify an OPUCn; the OMFI is located in the $(15n+1)^{th}$ to the $16n^{th}$ columns of the $4^{th}$ row of each group, successively increases in unit of an OPUCn, and is counted from 0 to 9 and then to 0 again, which is successively cycled. OPUCns of 0 to 9 form one 10-OPUCn multiframe, and the receive end device may identify the OPUCn according to the OMFI.

Figures 6B, 6C:
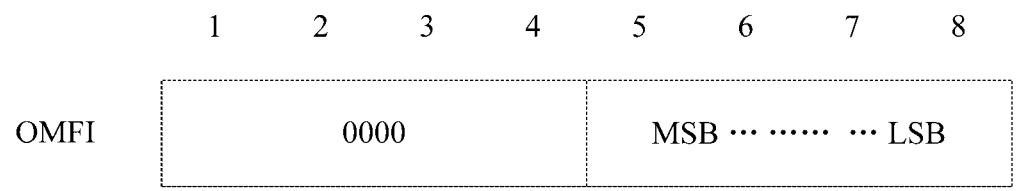
FIG. 6B is a schematic diagram of a PSI byte structure.
FIG. 6C is a schematic diagram of an OMFI byte structure.

FIG. 6B is a schematic diagram of a PSI byte structure. As shown in FIG. 6B, a PSI corresponding to each timeslot occupies 2 bytes, where a $1^{st}$ bit of the $1^{st}$ byte indicates whether a corresponding timeslot is occupied (Occupation): if the corresponding timeslot is occupied, the bit is assigned 1; otherwise, if the corresponding timeslot is not occupied, the bit is assigned 0. The $2^{nd}$ to the $8^{th}$ bits of the $1^{st}$ byte and the $1^{st}$ to the $8^{th}$ bits of the $2^{nd}$ byte, which are 15 bits in total, indicate tributary port numbers (Tributary Port, or "TP") allocated to the corresponding timeslot, that is, a service indication for carrying an LO ODU in the timeslots. If an OPUCn carries an LO ODU service, a payload type (PT) is assigned 0x22, and is located in the $(14n+1)^{th}$ column of the $4^{th}$ row of each group.

FIG. 6C is a schematic diagram of an OMFI byte structure. As shown in FIG. 6C, values from a most significant bit (MSB) to a least significant bit (LSB) of an OMFI are 0 to 9 and are successively cycled.

Figure 7:
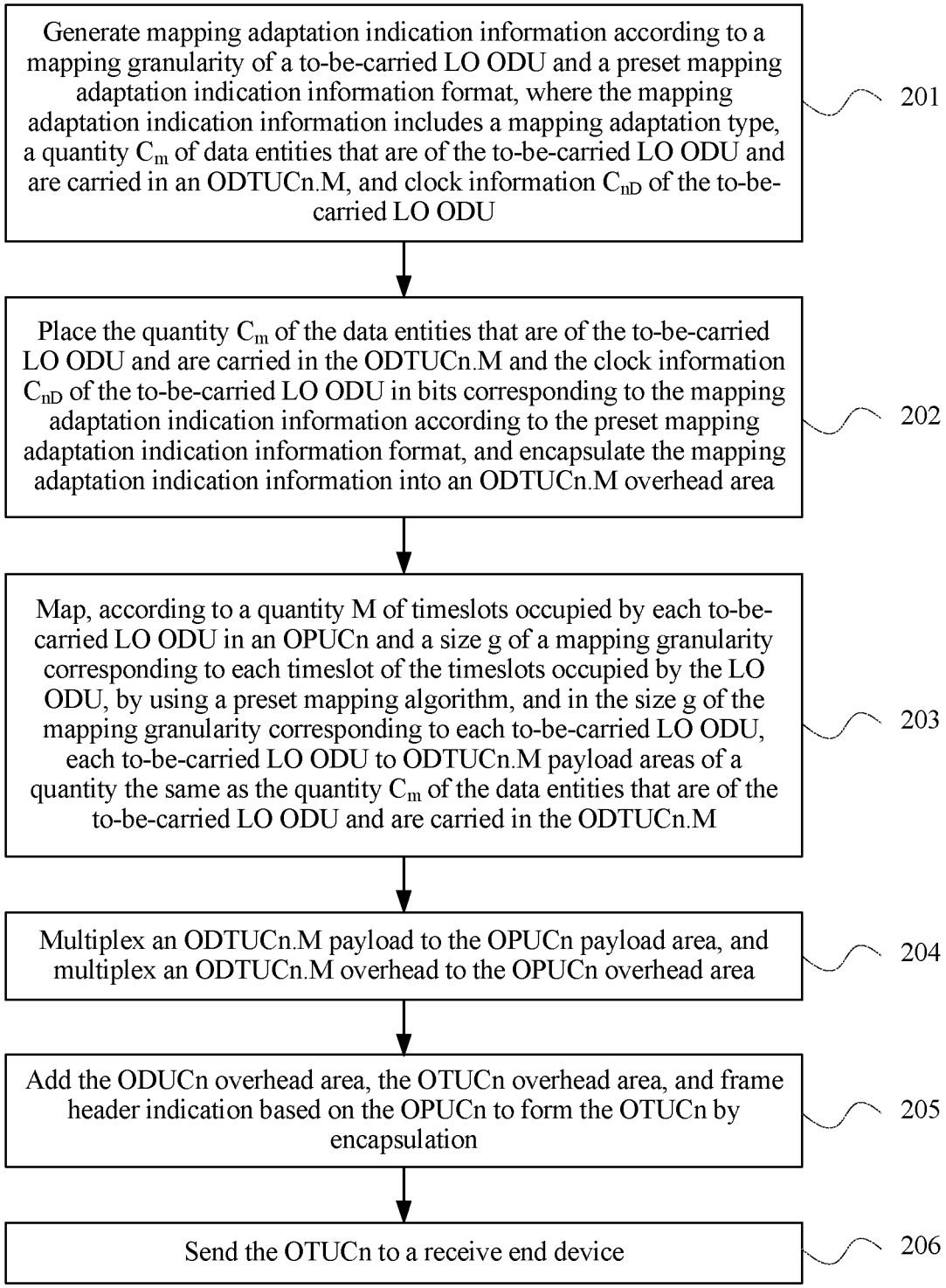
FIG. 7 is a flowchart of another embodiment of a service mapping processing method for an optical transport network according to the present disclosure.

FIG. 7 is a flowchart of another embodiment of a service mapping processing method for an optical transport network according to the present disclosure. As shown in FIG. 7, based on the schematic structural diagrams shown in FIG. 5A to FIG. 6C, the method of this embodiment may include:

Step 201: Generate mapping adaptation indication information according to a mapping granularity of a to-be-carried LO ODU and a preset mapping adaptation indication information format, where the mapping adaptation indication information includes a mapping adaptation type, a quantity $C_m$ of data entities that are of the to-be-carried LO ODU and are carried in the ODTUCn.M, and clock information $C_{nD}$ of the to-be-carried LO ODU.

Specifically, the quantity $C_m$ of the data entities that are of the to-be-carried LO ODU and are carried in the ODTUCn.M is obtained by calculation according to a quantity M of timeslots occupied by the to-be-carried LO ODU in an OPUCn, a size g of the mapping granularity corresponding to each timeslot of the timeslots occupied by the LO ODU, and a quantity of bytes of the to-be-carried LO ODU transmitted in an ODTUCn.M period; and the clock information $C_{nD}$ of the to-be-carried LO ODU is obtained by calculation according to the quantity M of the timeslots occupied by the to-be-carried LO ODU in the OPUCn, the size g of the mapping granularity corresponding to each timeslot of the timeslots occupied by the LO ODU, and the quantity of the bytes of the to-be-carried LO ODU transmitted in the ODTUCn.M period.

The mapping granularity (M×g bytes) is configured by a network management system (NMS) or transport software-defined network (T-SDN), and a transmit end device determines the mapping adaptation type in the mapping adaptation indication information according to the g of the mapping granularity. The mapping adaptation type in the mapping adaptation indication information, the quantity $C_m$ of the data entities that are of the to-be-carried LO ODU and are carried in the ODTUCn.M, and the clock information $C_{nD}$ of the to-be-carried LO ODU are combined according to a mapping adaptation indication information format, the mapping adaptation indication information is carried in a TSOH, and for the mapping adaptation indication information format, reference may be made to FIG. 9A to FIG. 9C. Reference may be made to Table 1 for a relationship among the mapping adaptation type, a mapping granularity g bytes corresponding to a single OPUCn timeslot, and a mapping granularity of the LO ODU, and Table 2 is an illustration in which a low order ODUk is mapped to $C_m$ and $C_{nD}$ that correspond to the ODTUCn.M in each mapping granularity, where a $C_m$ value of a decimal in the table is a theoretical calculation value, and in actual transmission, the decimal needs to be rounded for transmission. K=2 indicates that a bit rate level is 10 Gbit/s, k=3 indicates that the bit rate level is 40 Gbit/s, k=4 indicates that the bit rate level is 100 Gbit/s, and k=flex indicates that a bit rate is arbitrary (an ODUflex shown in Table 2 is at a 1 T bit/s level).

TABLE 1

| Adaptive_Type | Mapping Granularity g Corresponding to a Single OPUCn Timeslot | Mapping Granularity of the LO ODU | Clock Information Granularity of the LO ODU |
| --- | --- | --- | --- |
| 0x1 | 1 byte ($C_8$) | M | $C_{8D}$ |
| 0x2 | 2 bytes ($C_{16}$) | M × 2 | $C_{8D}$ |
| 0x3 | 4 bytes ($C_{32}$) | M × 4 | $C_{8D}$ |
| 0x4 | 8 bytes ($C_{64}$) | M × 8 | $C_{8D}$ |

TABLE 2

| | Mapping of ODU2 to ODTUCn.1 | | Mapping of ODU3 to ODTUCn.4 | | Mapping of ODU4 to ODTUCn.10 | | Mapping of ODUflex to ODTUCn.100 | |
|---|---|---|---|---|---|---|---|---|
| | $C_m$ | $C_{nD}$ | $C_m$ | $C_{nD}$ | $C_m$ | $C_{nD}$ | $C_m$ | $C_{nD}$ |
| $C_8$ mapping granularity | $C_8$ 14521.51899 | NA NA | $C_{32}$ 14583.05085 | $C_{8D}$ 0 . . . 3 | $C_{80}$ 15161.23348 | $C_{8D}$ 0 . . . 9 | $C_{800}$ 15161.23348 | $C_{8D}$ 0 . . . 99 |
| $C_{32}$ mapping granularity | $C_{32}$ 3630.379747 | $C_{8D}$ 0 . . . 3 | $C_{128}$ 3645.762712 | $C_{8D}$ 0 . . . 15 | $C_{320}$ 3790.30837 | $C_{8D}$ 0 . . . 39 | $C_{3200}$ 3790.30837 | $C_{8D}$ 0 . . . 399 |
| $C_{64}$ mapping granularity | $C_{64}$ 1815.189873 | $C_{8D}$ 0 . . . 7 | $C_{256}$ 1822.881356 | $C_{8D}$ 0 . . . 31 | $C_{640}$ 1895.154185 | $C_{8D}$ 0 . . . 79 | $C_{6400}$ 1895.154185 | $C_{8D}$ 0 . . . 799 |

Step 202: Place the quantity $C_m$ of the data entities that are of the to-be-carried LO ODU and are carried in the ODTUCn.M and the clock information $C_{nD}$ of the to-be-carried LO ODU in bits corresponding to the mapping adaptation indication information according to the preset mapping adaptation indication information format, and encapsulate the mapping adaptation indication information into an ODTUCn.M overhead area.

Steps 201 and 202 are a further implementation manner of the foregoing step 101. The transmit end device calculates the quantity $C_m$ ($C_m$, m=M×g) of the data entities that are of the to-be-carried LO ODU and are carried in the ODTUCn.M. For the quantity of the bytes of the to-be-carried LO ODU transmitted in the ODTUCn.M period, a specific quantity of bytes of the LO ODU may be obtained by periodically counting a quantity of increment bytes of an LO ODU that is input into a cache and, at the same time, by determining a cache empty-full situation. The quantity $C_m$ of the data entities that are of the to-be-carried LO ODU and are carried in the ODTUCn.M may be calculated by using a formula $$C_m = \left\lfloor \frac{\text{Quantity of bytes of the } LO\ ODU}{M \times g} \right\rfloor,$$

and the clock information $C_{nD}$ of the to-be-carried LO ODU is calculated by using a formula $$C_{nD} = \text{Quantity of bytes of the } LO\ ODU - \left\lfloor \frac{\text{Quantity of bytes of the } LO\ ODU}{M \times g} \right\rfloor \times M \times g.$$

The transmit end device places the quantity $C_m$ of the data entities that are of the to-be-carried LO ODU and are carried in the ODTUCn.M and the clock information $C_{nD}$ of the to-be-carried LO ODU in the bits corresponding to the mapping adaptation indication information according to the foregoing mapping adaptation indication information format, and encapsulates the mapping adaptation indication information into the ODTUCn.M overhead area, that is, places the mapping adaptation indication information in a TSOH of a corresponding timeslot.

Step 203: Map, according to a quantity M of timeslots occupied by each to-be-carried LO ODU in an OPUCn and a size g of a mapping granularity corresponding to each timeslot of the timeslots occupied by the LO ODU, by using a preset mapping algorithm, and in the size g of the mapping granularity corresponding to each to-be-carried LO ODU, each to-be-carried LO ODU to ODTUCn.M payload areas of a quantity the same as the quantity $C_m$ of the data entities that are of the to-be-carried LO ODU and are carried in the ODTUCn.M.

Step 203 is a further implementation manner of the foregoing step 102. The transmit end device maps, according to the preset mapping algorithm, data of $C_m$ to-be-carried LO ODUs whose size of a mapping granularity is g bytes to the ODTUCn.M payload areas, where the preset mapping algorithm may be a Σ-Δ algorithm.

Step 204: Multiplex an ODTUCn.M payload to an OPUCn payload area, and multiplex an ODTUCn.M overhead to an OPUCn overhead area.

Step 205: Add an ODUCn overhead area, an OTUCn overhead area, and a frame header indication based on the OPUCn to form an OTUCn obtained by encapsulation.

Steps 204 and 205 are a further implementation manner of the foregoing step 103. The transmit end device multiplexes the ODTUCn.M payload to the OPUCn payload area, and multiplexes the ODTUCn.M overhead to the OPUCn overhead area, that is, separately encapsulates the ODTUCn.M payload area and the ODTUCn.M overhead area into timeslots that are determined in the OPUCn payload area and the OPUCn overhead area of the OTUCn and carry the ODTUCn.M. The ODUCn overhead area, the OTUCn overhead area, and a frame header indication area are added based on the OPUCn to form a final OTUCn frame.

Step 206: Send the OTUCn to a receive end device.

According to the foregoing method embodiment, timeslots for carrying an LO ODU and mapping adaptation indication information filled in a corresponding timeslot overhead area are respectively determined in an OPUCn payload area and an OPUCn overhead area.

Figure 8A:
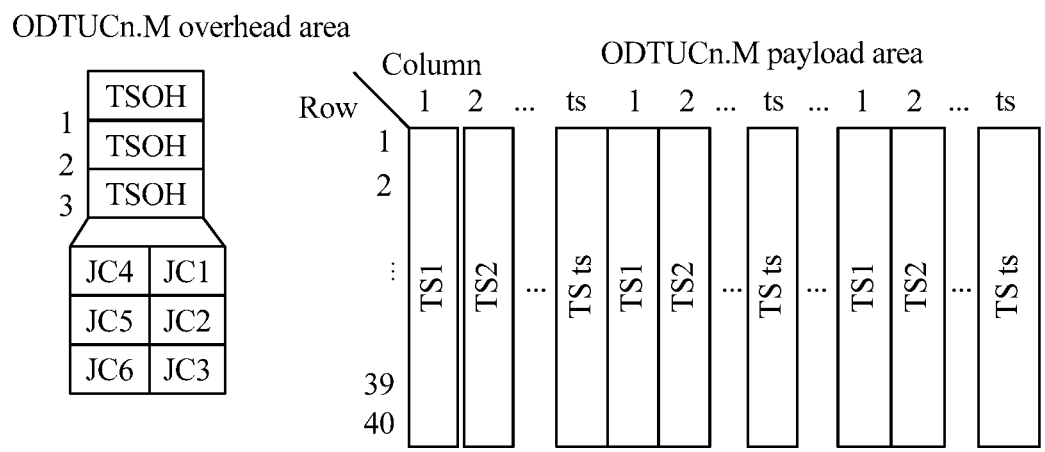
FIG. 8A is a schematic diagram of a structure of an ODTUCn.M.

FIG. 8A is a schematic diagram of a structure of an ODTUCn.M. As shown in 8A, the ODTUCn.M includes ts timeslots in a 10-OPUCn multiframe and timeslot overheads corresponding to the ts timeslots, and ts indicates a timeslot quantity. An ODTUCn.M payload area of the ODTUCn.M includes 40 rows×(380×ts) columns, and an ODTUCn.M overhead area includes TSOHs corresponding to one timeslot of the ts timeslots, where the timeslot overhead may be selected as a timeslot overhead corresponding to a timeslot with a maximum code of the ts timeslots.

Figure 8B:
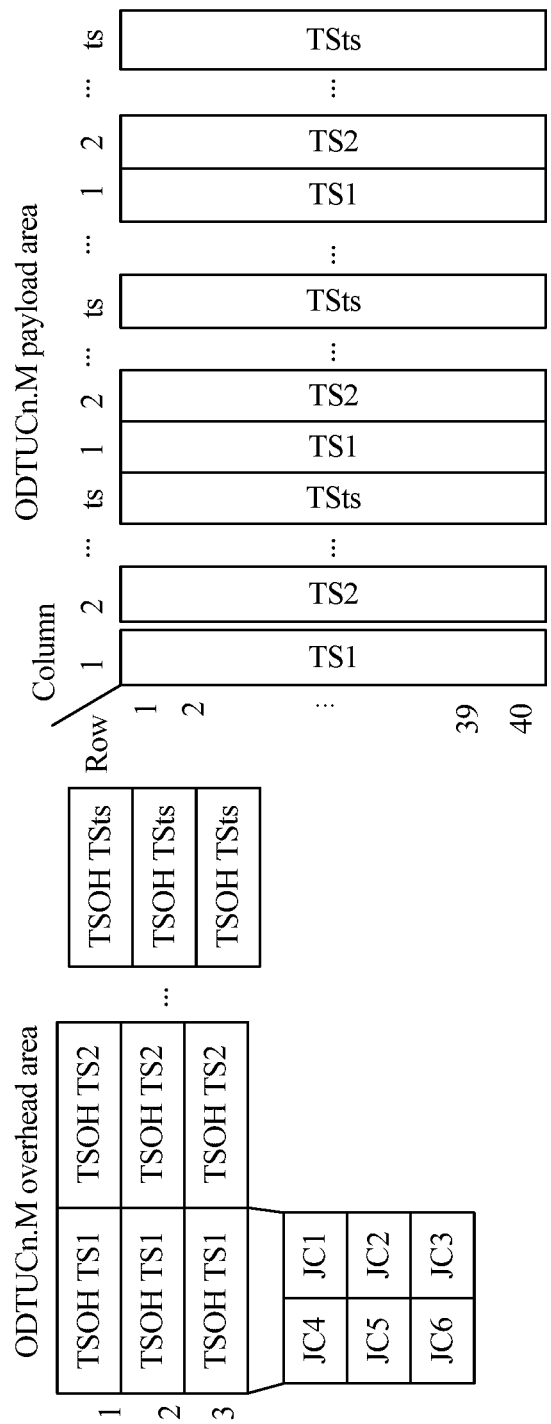
FIG. 8B is a schematic diagram of another structure of an ODTUCn.M.

FIG. 8B is a schematic diagram of another structure of an ODTUCn.M. As shown in FIG. 8B, the ODTUCn.M includes ts timeslots in a 10-OPUCn multiframe and timeslot overheads corresponding to the ts timeslots, and ts indicates a timeslot quantity. An ODTUCn.M payload area of the ODTUCn.M includes 40 rows×(380×ts) columns, and an ODTUCn.M overhead area includes TSOHs corresponding to the ts timeslots.

Figure 9A:
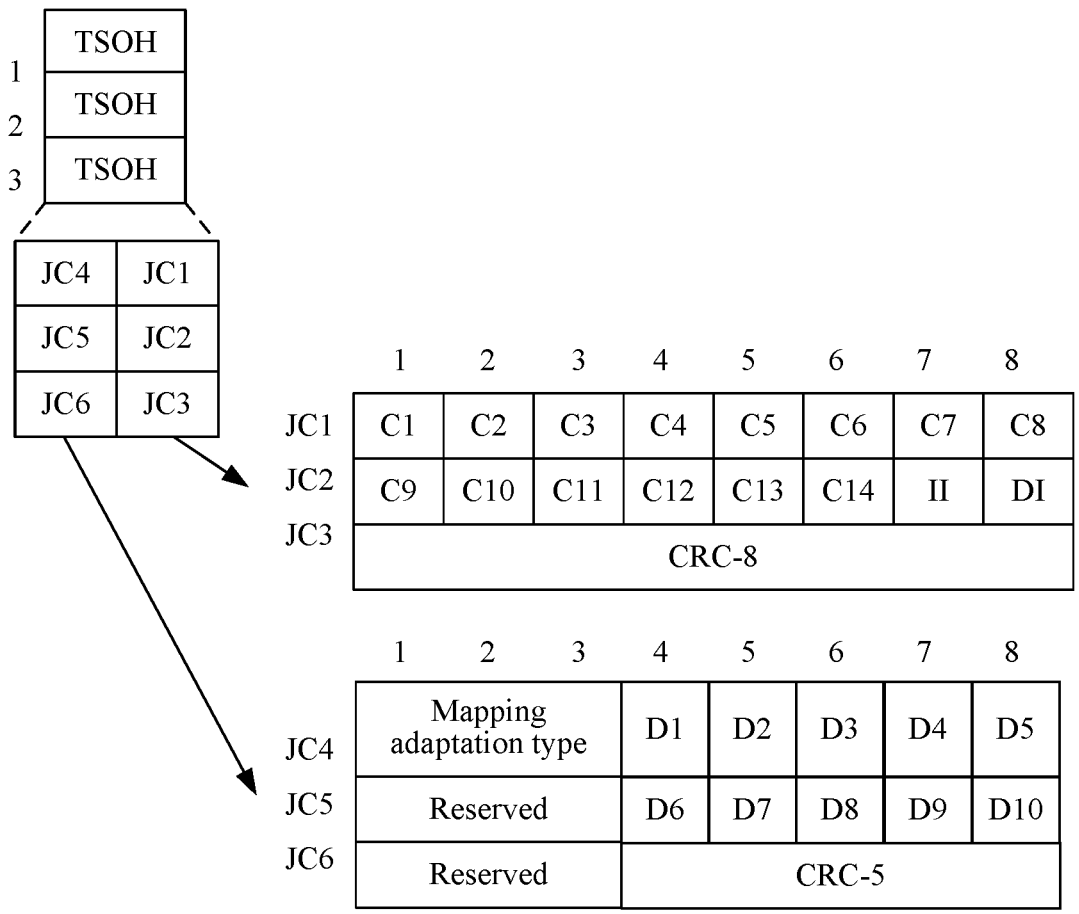
FIG. 9A is a schematic diagram of a format of a TSOH.

FIG. 9A is a schematic diagram of a format of a TSOH. As shown in FIG. 9A, this format is based on an overhead format allocation manner in an original GMP, and uses a reserved bit to indicate added information of the present disclosure. J1 and J2 are used to store a quantity $C_m$ of data entities that are of a to-be-carried LO ODU and are carried in an ODTUCn.M, and C1 to C14 indicate $C_m$ of 14 bits. An increment indicator (II) is placed in the $7^{th}$ bit of J2, and a decrement indicator (DI) is placed in the $8^{th}$ bit of J2; cyclic redundancy check (CRC)-8 check information of J1 and J2 bytes is placed in J3; the $4^{th}$ to the $8^{th}$ bits of J4 and J5 are used to place clock information $C_{nD}$ of the to-be-carried LO ODU and are 10 bits in total, and D1 to D10 indicate $C_{nD}$ of 10 bits; and the $4^{th}$ to the $8^{th}$ bits of J6 are used to place CRC-5 check information of J4 and J5. Reserved bits 1 to 3 of J4 are added and allocated and are used to place a mapping adaptation type. This format is suitable for the ODTUCn.M structure shown in FIG. 8A.

Figure 9B:
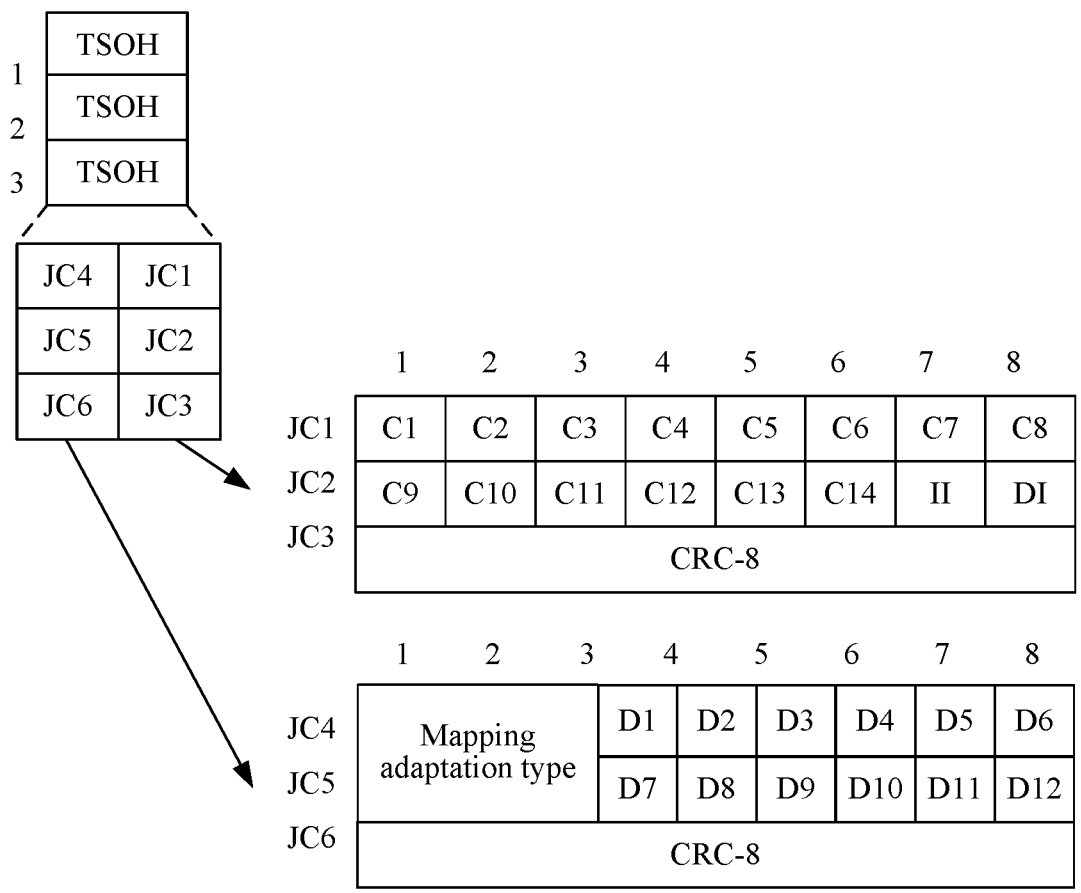
FIG. 9B is a schematic diagram of another format of a TSOH.

FIG. 9B is a schematic diagram of another format of a TSOH. As shown in FIG. 9B, this format readjusts allocation of 6 bytes of the TSOH. J1 and J2 are used to store a quantity $C_m$ of data entities that are of a to-be-carried LO ODU and are carried in the ODTUCn.M, and C1 to C14 indicate $C_m$ of 14 bits. An II is placed in the $7^{th}$ bit of J2, and a DI is placed in the $8^{th}$ bit of J2; CRC-8 check information of J1 and J2 bytes is placed in J3; the $1^{st}$ and the $2^{nd}$ bits of J4 and J5 are used to place a mapping adaptation type and are 4 bytes in total; the $3^{rd}$ to the $8^{th}$ bits of J4 and J5 are used to place clock information $C_{nD}$ of the to-be-carried LO ODU and are 12 bits in total, and D1 to D12 indicate $C_{nD}$ of 12 bits; and CRC-8 check information of J4 and J5 bytes is placed in a J6 byte. This format is suitable for the ODTUCn.M structure shown in FIG. 8A.

Figure 9C:
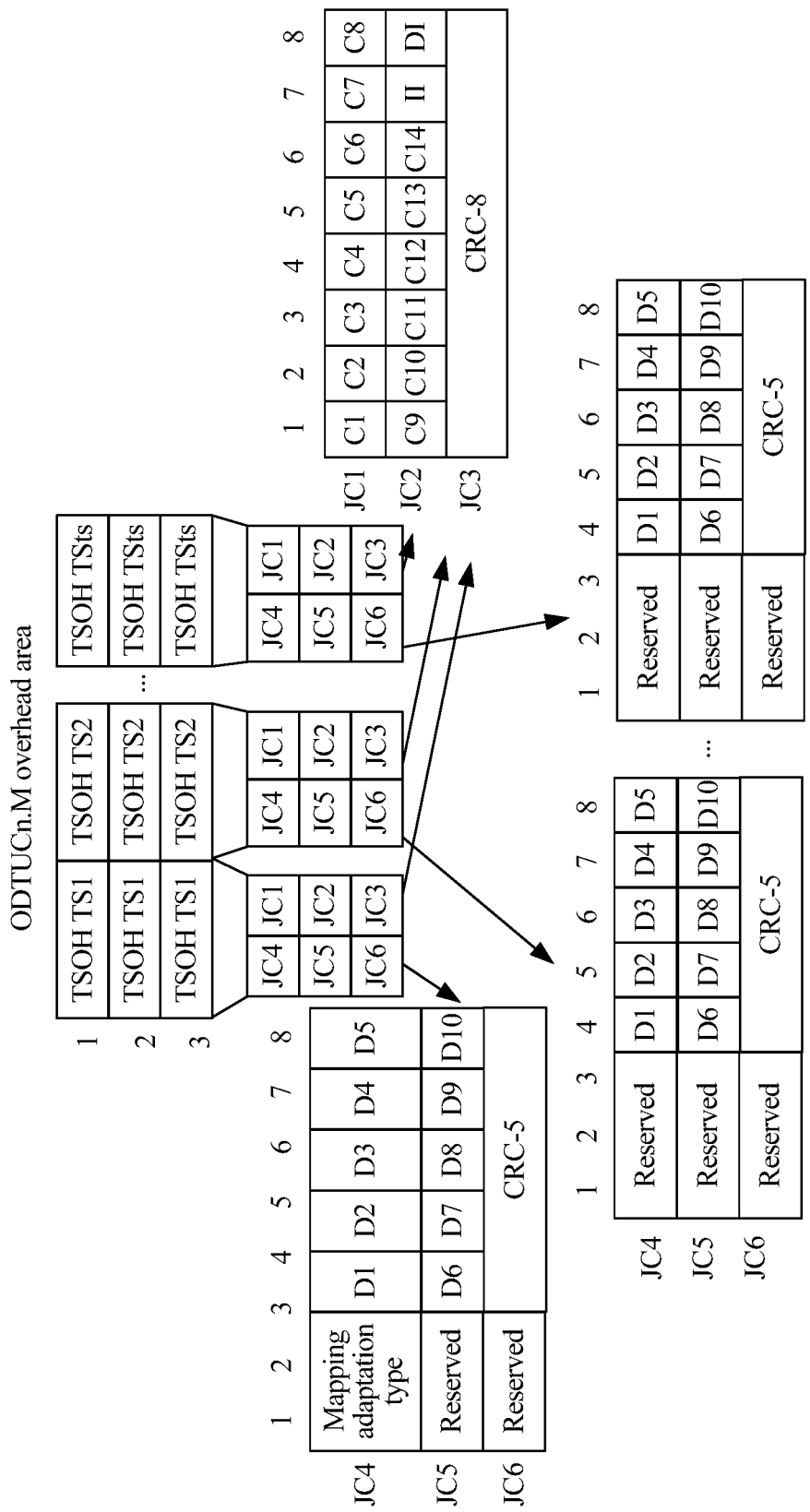
FIG. 9C is a schematic diagram of still another format of a TSOH.

FIG. 9C is a schematic diagram of still another format of a TSOH. As shown in FIG. 9C, this format extends a placement manner of clock information $C_{nD}$ of the to-be-carried LO ODU. J1 and J2 are used to store a quantity $C_m$ of data entities that are of the to-be-carried LO ODU and are carried in the ODTUCn.M, and C1 to C14 indicate $C_m$ of 14 bits. An II is placed in the $7^{th}$ bit of J2, and a DI is placed in the $8^{th}$ bit of J2; CRC-8 check information of J1 and J2 bytes is placed in J3; the $4^{th}$ to the $8^{th}$ bits of J4 and J5 are used to place one piece of clock information $C_{nD}$ ts of the clock information of the to-be-carried LO ODU and are 10 bits in total; D1 to D10 indicate $C_{nD}$ is of 10 bits; the $4^{th}$ to the $8^{th}$ bits of J6 are used to place CRC-5 check information of J4 and J5. Reserved bits 1 to 3 of the J4 bytes are added and are used to place a mapping adaptation type. For the $4^{th}$ to the $8^{th}$ bits of J4 and J5, specifically, one piece of clock information $C_{nD}$ 1 of the clock information of the to-be-carried LO ODU is placed in timeslot overheads corresponding to the first timeslot of the ODTUCn.M, there are 10 bits in total, and D1 to D10 indicate $C_{nD}$ 1 of 10 bits. One piece of clock information $C_{nD}$ 2 of the clock information of the to-be-carried LO ODU is placed in timeslot overheads corresponding to the second timeslot of the ODTUCn.M, there are 10 bits in total, and D1 to D10 indicate $C_{nD}$ 2 of 10 bytes, by analogy, until the ts$^{th}$ timeslot. Therefore, the clock information of the to-be-carried LO ODU is $C_{nD}=C_{nD}1+C_{nD}2+\cdots+C_{nD}$ ts. This format is suitable for the ODTUCn.M structure shown in FIG. 8B.

According to this embodiment, a mapping granularity is determined and mapping adaptation indication information is generated according to the mapping granularity, to instruct a receive end device to perform corresponding demapping. This implements mapping granularity-based mapping from an LO ODU to an ODTUCn.M, and resolves a problem in an existing situation with a fixed mapping granularity that OTUCns that carry a same LO ODU but use different mapping granularities cannot interwork between a receive end and a transmit end.

It should be noted that, the examples shown in FIG. 9A to FIG. 9C are only three examples of the TSOH structure, and any other deployment manner suitable for each bit of JC1 to JC6 may be used to carry the mapping adaptation indication information of the present disclosure, which is not limited herein.

Figure 10:
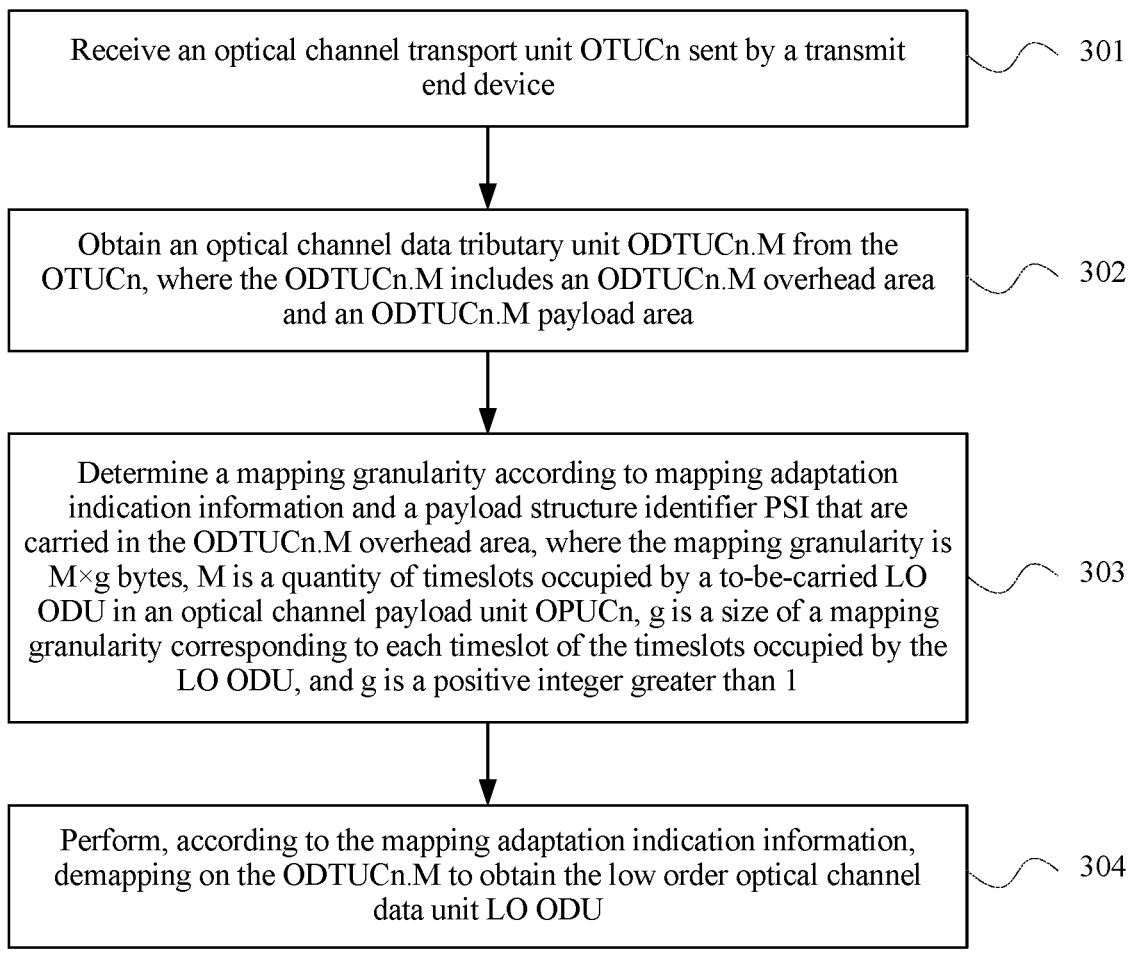
FIG. 10 is a flowchart of still another embodiment of a service mapping processing method for an optical transport network according to the present disclosure.

FIG. 10 is a flowchart of still another embodiment of a service mapping processing method for an optical transport network according to the present disclosure. As shown in FIG. 10, the method in this embodiment may include the following steps.

Step 301: Receive an optical channel transport unit OTUCn sent by a transmit end device.

This embodiment may be executed by a receive end device in an OTN. The receive end device receives the OTUCn sent by the transmit end device.

Step 302: Obtain an optical channel data tributary unit ODTUCn.M from the OTUCn, where the ODTUCn.M includes an ODTUCn.M overhead area and an ODTUCn.M payload area.

Step 303: Determine a mapping granularity according to mapping adaptation indication information and a payload structure identifier PSI that are carried in the ODTUCn.M overhead area, where the mapping granularity is M×g bytes, M is a quantity of timeslots occupied by a to-be-carried LO ODU in an optical channel payload unit OPUCn, g is a size of a mapping granularity corresponding to each timeslot of the timeslots occupied by the LO ODU, and g is a positive integer greater than 1.

The receive end device extracts the ODTUCn.M from the OTUCn by performing steps opposite to those in the method embodiments shown in FIG. 1 and FIG. 7, that is, obtains the ODTUCn.M payload area and the ODTUCn.M overhead area of the ODTUCn.M from timeslots corresponding to an OPUCn payload area and an OPUCn overhead area in the OTUCn and parses out the mapping adaptation indication information and the payload structure identifier PSI from the ODTUCn.M overhead area, and determines the mapping granularity.

Step 304: Perform, according to the mapping adaptation indication information, demapping on the ODTUCn.M to obtain a low order optical channel data unit LO ODU.

The receive end device demaps the LO ODU from the ODTUCn.M according to the mapping adaptation indication information and the mapping granularity.

According to this embodiment, mapping adaptation indication information and a mapping granularity are obtained from an overhead area, and an ODTUCn.M is demapped from a received OTUCn to obtain an LO ODU. This implements demapping from the ODTUCn.M to the LO ODU based on the mapping granularity, and resolves a problem in an existing situation with a fixed mapping granularity that OTUCns that carry a same LO ODU but use different mapping granularities cannot interwork between a receive end and a transmit end.

A process in which the receive end device obtains the LO ODU from the OTUCn is exactly opposite to a process of mapping from the LO ODU to the OTUCn of the transmit end device. Therefore, in a demapping process, the mapping adaptation indication information and the mapping granularity are first obtained, and the LO ODU may be obtained from a corresponding timeslot based on the two pieces of information. A related frame structure involved in the demapping process is consistent with the foregoing method embodiment, which is not described herein.

Figure 11:
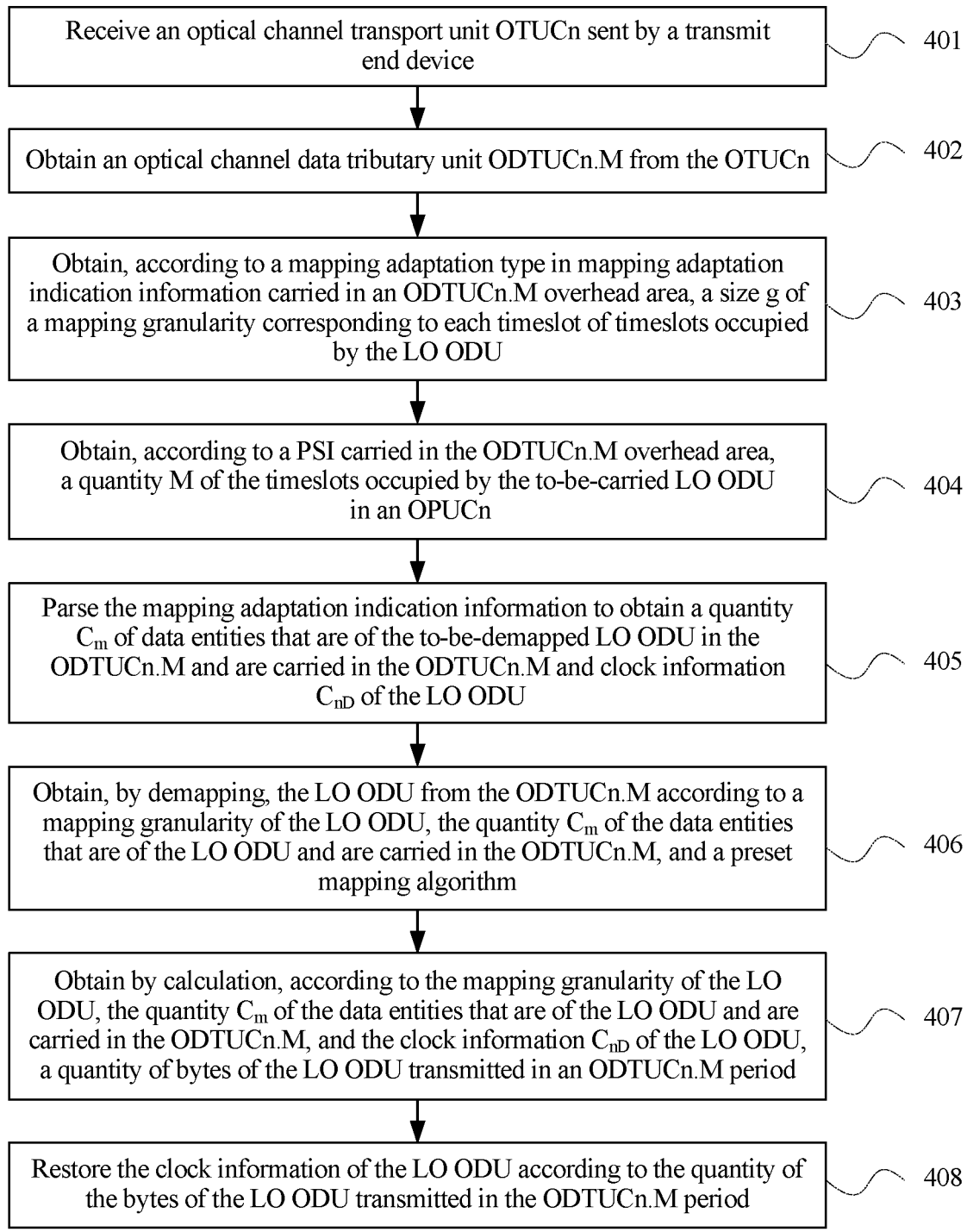
FIG. 11 is a flowchart of yet another embodiment of a service mapping processing method for an optical transport network according to the present disclosure.

FIG. 11 is a flowchart of yet another embodiment of a service mapping processing method for an optical transport network according to the present disclosure. As shown in FIG. 11, the method in this embodiment may include the following steps.

Step 401: Receive an optical channel transport unit OTUCn sent by a transmit end device.

Step 402: Obtain an optical channel data tributary unit ODTUCn.M from the OTUCn.

Step 403: Obtain, according to a mapping adaptation type in mapping adaptation indication information carried in an ODTUCn.M overhead area, a size g of a mapping granularity corresponding to each timeslot of timeslots occupied by an LO ODU.

Step 404: Obtain, according to the PSI carried in the ODTUCn.M overhead area, a quantity M of timeslots occupied by the to-be-carried LO ODU in an OPUCn.

Steps 402 to 404 are a further implementation manner of the foregoing step 303, where an implementation process of step 404 may be: obtaining an OMFI and the PSI from the ODTUCn.M overhead area; identifying the OPUCn according to the OMFI; learning, according to the PSI, a situation in which timeslots of the OPUCn are occupied; and determining, according to the PSI, the quantity M of the timeslots occupied by the to-be-carried LO ODU in the OPUCn.

Optionally, a receive end device determines whether the mapping granularity is consistent with a preconfigured mapping granularity. That is, if the receive end device determines that a size Cg of a mapping granularity is consistent with an external configuration, the external configuration may be configured by using an NMS or a T-SDN controller; or if the receive end device determines that a size Cg of a mapping granularity is inconsistent with an external configuration, a mapping granularity inconsistency alarm is reported.

Step 405: Parse the mapping adaptation indication information to obtain a quantity $C_m$ of data entities that are of the to-be-demapped LO ODU in the ODTUCn.M and are carried in the ODTUCn.M and clock information $C_{nD}$ of the LO ODU.

Step 406: Obtain, by demapping, the LO ODU from the ODTUCn.M according to a mapping granularity of the LO ODU, the quantity $C_m$ of the data entities that are of the LO ODU and are carried in the ODTUCn.M, and a preset mapping algorithm.

Step 407: Obtain by calculation, according to the mapping granularity of the LO ODU, the quantity $C_m$ of the data entities that are of the LO ODU and are carried in the ODTUCn.M, and the clock information $C_{nD}$ of the LO ODU, a quantity of bytes of the LO ODU transmitted in an ODTUCn.M period.

Step 408: Restore the clock information of the LO ODU according to the quantity of the bytes of the LO ODU transmitted in the ODTUCn.M period.

Steps 405 to 408 are a further implementation manner of the foregoing step 304. The receive end device parses the mapping adaptation indication information to obtain the quantity $C_m$ of the data entities that are of the to-be-demapped LO ODU in the ODTUCn.M and are carried in the ODTUCn.M and the clock information $C_{nD}$ of the LO ODU, and obtains, by demapping, the LO ODU from the ODTUCn.M by using a Σ-Δ algorithm; and then obtains, according to the size g of the mapping granularity corresponding to each timeslot of the timeslots occupied by the LO ODU, and a quantity $C_m$ value of the data entities that are of the to-be-demapped LO ODU and are carried in the ODTUCn.M and the clock information $C_{nD}$ of the LO ODU, the quantity Quantity of bytes of the LO ODU=$C_{nD}$+$C_m$× M×g of the bytes of the LO ODU transmitted in the ODTUCn.M period; and restores the clock information of the LO ODU according to the quantity of the bytes of the LO ODU.

According to this embodiment, mapping adaptation indication information and a mapping granularity are obtained from an overhead area, and an ODTUCn.M is demapped from a received OTUCn to obtain an LO ODU. This implements demapping from the ODTUCn.M to the LO ODU based on the mapping granularity, and resolves a problem in an existing situation with a fixed mapping granularity that OTUCns that carry a same LO ODU but use different mapping granularities cannot interwork between a receive end and a transmit end.

Figure 12:
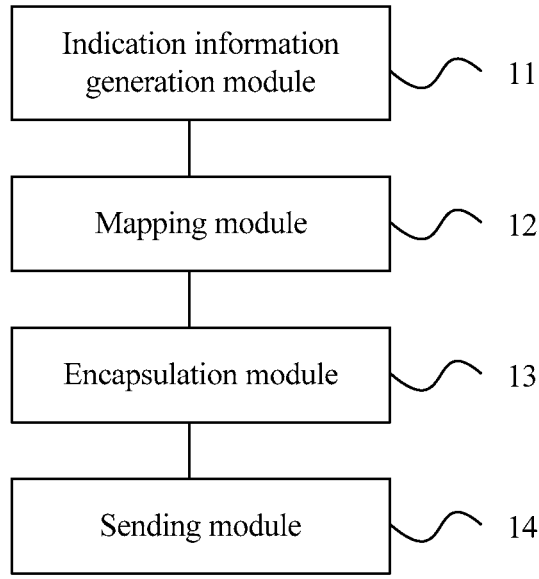
FIG. 12 is a schematic structural diagram of an embodiment of a transmit end apparatus according to the present disclosure.

FIG. 12 is a schematic structural diagram of an embodiment of a transmit end apparatus according to the present disclosure. As shown in FIG. 12, the apparatus in this embodiment may include: an indication information generation module 11, a mapping module 12, an encapsulation module 13, and a sending module 14, where the indication information generation module 11 is configured to generate mapping adaptation indication information according to a mapping granularity of a to-be-carried low order optical channel data unit LO ODU, where the mapping granularity is M×g bytes, M is a quantity of timeslots occupied by the to-be-carried LO ODU in an optical channel payload unit OPUCn, g is a size of a mapping granularity corresponding to each timeslot of the timeslots occupied by the LO ODU, and g is a positive integer greater than 1; the mapping module 12 is configured to map the to-be-carried LO ODU to an ODTUCn.M payload area in an optical channel data tributary unit ODTUCn.M according to the mapping adaptation indication information, where the ODTUCn.M includes an ODTUCn.M overhead area and the ODTUCn.M payload area; the encapsulation module 13 is configured to encapsulate the mapping adaptation indication information into the ODTUCn.M overhead area and encapsulate the ODTUCn.M into an optical channel transport unit OTUCn; and the sending module 14 is configured to send the OTUCn to a receive end apparatus.

The apparatus in this embodiment may be configured to implement the technical solution in the method embodiment shown in FIG. 1 or FIG. 7, and implementation principles and technical effects thereof are similar and details are not described herein.

Further, the mapping adaptation indication information includes: a mapping adaptation type, where the mapping adaptation type is used to indicate the size g of the mapping granularity corresponding to each timeslot of the timeslots occupied by the LO ODU.

Further, the mapping adaptation indication information further includes: a quantity $C_m$ of data entities that are of the to-be-carried LO ODU and are carried in the ODTUCn.M and clock information $C_{nD}$ of the to-be-carried LO ODU, where a size of the data entities is M×g bytes.

Further, the indication information generation module 11 is specifically configured to obtain by calculation, according to the quantity M of the timeslots occupied by the to-be-carried LO ODU in the OPUCn, the size g of the mapping granularity corresponding to each timeslot of the timeslots occupied by the LO ODU, and a quantity of bytes of the to-be-carried LO ODU transmitted in an ODTUCn.M period, the quantity $C_m$ of the data entities that are of the to-be-carried LO ODU and are carried in the ODTUCn.M; and obtain by calculation the clock information $C_{nD}$ of the to-be-carried LO ODU according to the quantity M of the timeslots occupied by the to-be-carried LO ODU in the OPUCn, the size g of the mapping granularity corresponding to each timeslot of the timeslots occupied by the LO ODU, and the quantity of the bytes of the to-be-carried LO ODU transmitted in the ODTUCn.M period.

Further, the indication information generation module 11 is further configured to generate another piece of mapping adaptation indication information according to a mapping granularity of another to-be-carried LO ODU, where the mapping granularity of the another LO ODU is $M_1 \times g_1$ bytes, $M_1$ is a quantity of timeslots occupied by the another LO ODU in the OPUCn, $g_1$ is a size of a mapping granularity corresponding to each timeslot of the timeslots occupied by the another LO ODU, and $g_1$ is a positive integer greater than 1, where $g_1$ is not equal to g; the mapping module 12 is further configured to map the another LO ODU to an ODTUCn.$M_1$ payload area according to the another piece of mapping adaptation indication information, where the ODTUCn.$M_1$ includes an ODTUCn.$M_1$ overhead area and the ODTUCn.$M_1$ payload area; and the encapsulation module 13 is further configured to encapsulate the another piece of mapping adaptation indication information into the ODTUCn.$M_1$ overhead area; and encapsulate the ODTUCn.$M_1$ into the OTUCn.

Further, the mapping granularity is configured by a network management system NMS or a transport software-defined network T-SDN controller.

The indication information generation module 11, the mapping module 12, and the encapsulation module 13 in this embodiment may be implemented by using a central processing unit (CPU), the sending module 14 may be implemented by using a transmitter, and a memory stores a code program and related data. The CPU, the transmitter, and the memory may be connected to each other by using a bus, where the CPU is configured to read the code program from the memory, and perform the steps of the method embodiment shown in FIG. 1 or FIG. 7, the transmitter is configured to send, to a receive end device, an OTUCn that carries an LO ODU corresponding to multiple services. For a specific implementation process, refer to the foregoing embodiments, and details are not described herein.

Figure 13:
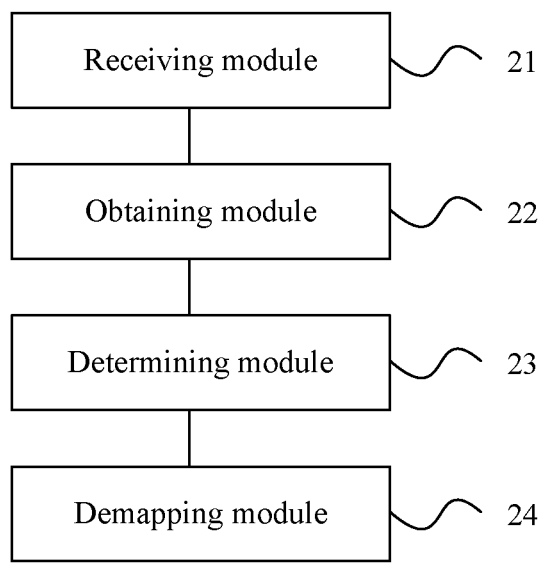
FIG. 13 is a schematic structural diagram of an embodiment of a receive end apparatus according to the present disclosure.

FIG. 13 is a schematic structural diagram of an embodiment of a receive end apparatus according to the present disclosure. As shown in FIG. 13, the apparatus in this embodiment may include: a receiving module 21, an obtaining module 22, a determining module 23, and a demapping module 24, where the receiving module 21 is configured to receive an optical channel transport unit OTUCn sent by a transmit end device; the obtaining module 22 is configured to obtain an optical channel data tributary unit ODTUCn.M from the OTUCn, where the ODTUCn.M includes an ODTUCn.M overhead area and an ODTUCn.M payload area; the determining module 23 is configured to determine a mapping granularity according to mapping adaptation indication information and a payload structure identifier PSI that are carried in the ODTUCn.M overhead area, where the mapping granularity is M×g bytes, M is a quantity of timeslots occupied by the to-be-carried LO ODU in an optical channel payload unit OPUCn, g is a size of a mapping granularity corresponding to each timeslot of the timeslots occupied by the LO ODU, and g is a positive integer greater than 1; and the demapping module 24 is configured to perform, according to the mapping adaptation indication information, demapping on the ODTUCn.M to obtain a low order optical channel data unit LO ODU.

The apparatus in this embodiment may be configured to implement the technical solution in the method embodiment shown in FIG. 10 or FIG. 11, and implementation principles and technical effects thereof are similar and details are not described herein.

Further, the mapping adaptation indication information includes: a mapping adaptation type, where the mapping adaptation type is used to indicate the size g of the mapping granularity corresponding to each timeslot of the timeslots occupied by the LO ODU.

Further, the mapping adaptation indication information further includes: a quantity $C_m$ of data entities that are of the to-be-carried LO ODU and are carried in the ODTUCn.M and clock information $C_{nD}$ of the to-be-carried LO ODU, where a size of the data entities is M×g bytes.

Further, the determining module 23 is specifically configured to obtain, according to the mapping adaptation indication information, the size g of the mapping granularity corresponding to each timeslot of the timeslots occupied by the LO ODU; and obtain, according to the PSI, the quantity M of the timeslots occupied by the to-be-carried LO ODU in the OPUCn.

Further, the demapping module 24 is specifically configured to parse the mapping adaptation indication information to obtain a quantity $C_m$ of data entities that are of the to-be-demapped LO ODU in the ODTUCn.M and are carried in the ODTUCn.M and the clock information $C_{nD}$ of the LO ODU; obtain, by demapping, the LO ODU from the ODTUCn.M according to the mapping granularity, the quantity $C_m$ of the data entities that are of the LO ODU and are carried in the ODTUCn.M, and a preset mapping algorithm; obtain by calculation, according to the mapping granularity, the quantity $C_m$ of the data entities that are of the LO ODU and are carried in the ODTUCn.M, and the clock information $C_{nD}$ of the LO ODU, a quantity of bytes of the LO ODU transmitted in an ODTUCn.M period; and restore the clock information of the LO ODU according to the quantity of the bytes of the LO ODU transmitted in the ODTUCn.M period.

The obtaining module 22, the determining module 23, and the demapping module 24 in this embodiment may be implemented by using a CPU, the receiving module 21 may be implemented by using a receiver, and a memory stores a code program and related data. The CPU, the receiver, and the memory may be connected to each other by using a bus, where the receiver is configured to receive an OTUCn that is sent by the transmit end device and carries an LO ODU corresponding to multiple services, and the CPU is configured to read the code program from the memory, and perform the steps of the method embodiment shown in FIG. 10 or FIG. 11. For a specific implementation process, refer to the foregoing embodiment, and details are not described herein.

Figure 14:
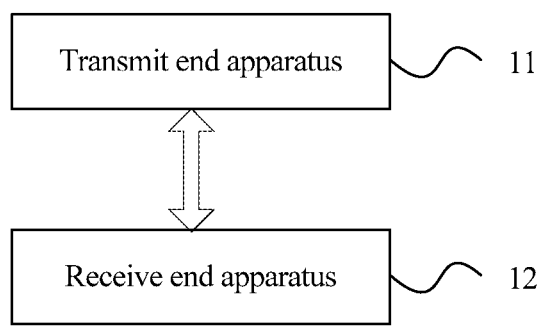
FIG. 14 is a schematic structural diagram of an embodiment of an optical transport network according to the present disclosure.
Figure 15:
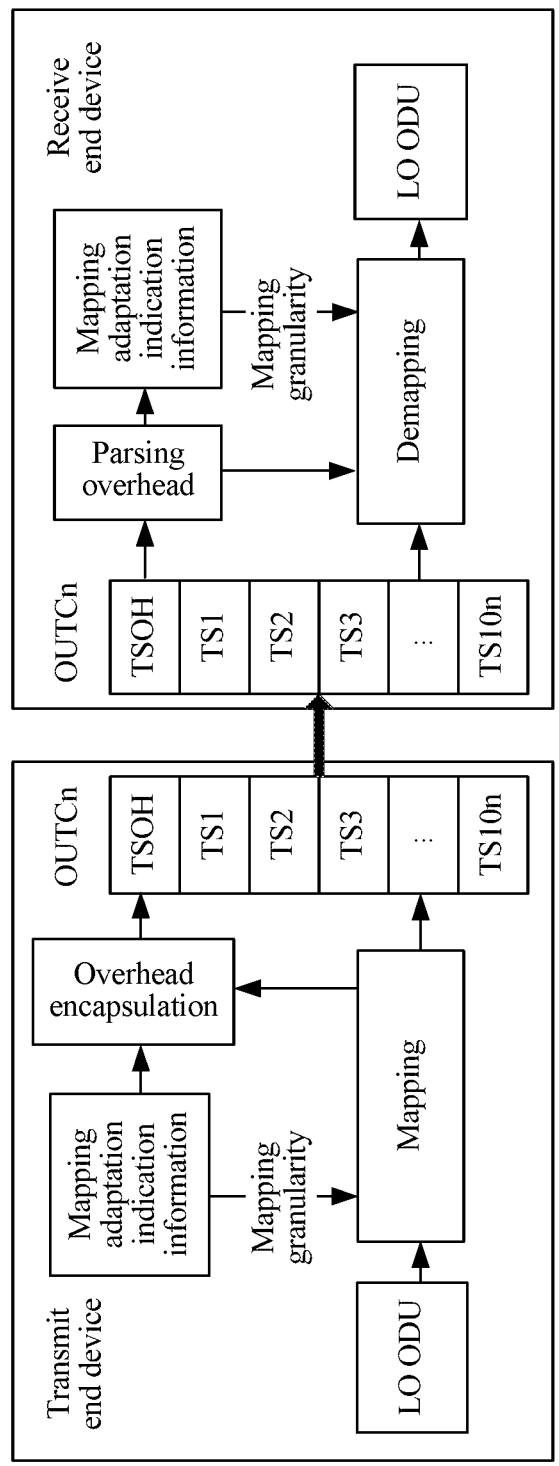
FIG. 15 is a schematic diagram of a mapping processing process of a receive end and a transmit end according to the present disclosure.

FIG. 14 is a schematic structural diagram of an embodiment of an optical transport network according to the present disclosure. As shown in FIG. 14, the system in this embodiment includes: a transmit end apparatus 11 and a receive end apparatus 12. The transmit end apparatus 11 may use the apparatus embodiment structure shown in FIG. 12, and correspondingly, may implement the technical solution in the method embodiment shown in FIG. 1 or FIG. 7, and implementation principles and technical effects thereof are similar and details are not described herein. The receive end apparatus 12 may use the apparatus embodiment structure shown in FIG. 13, and correspondingly, may implement the technical solution in the method embodiment shown in FIG. 10 or FIG. 11, and implementation principles and technical effects thereof are similar and details are not described herein. FIG. 15 is a schematic diagram of a mapping processing process of a receive end and a transmit end according to the present disclosure. Based on the schematic structure in FIG. 14, mapping and demapping processes between an LO ODU and an OTUCn may be implemented at the receive end and the transmit end.

According to the present disclosure, an LO ODU needs to be mapped to an ODTUCn.M according to a mapping granularity. A case that a mapping granularity corresponding to an illustrated single OPUCn timeslot may be $C_{64}$, $C_{32}$, $C_{16}$, or $C_8$ exists; therefore, for cost reduction, it needs to consider to implement mapping and demapping processing that supports multiple mapping granularities in a same circuit.

Figure 16:
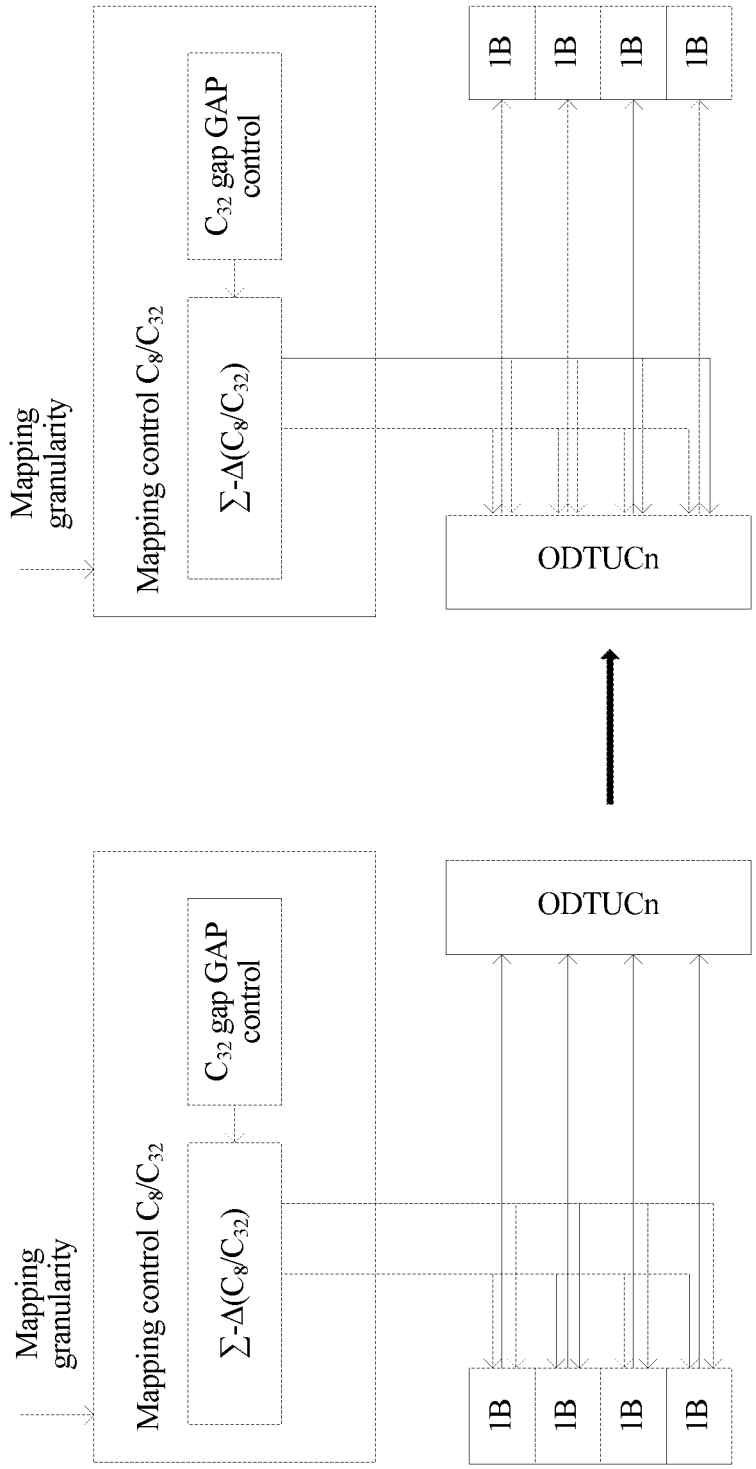
FIG. 16 is a schematic diagram of a circuit structure of a receive end and a transmit end of an optical transport network under fast-clock processing.

FIG. 16 is a schematic diagram of a circuit structure of a receive end and a transmit end of an optical transport network under fast-clock processing. As shown in FIG. 16, a $C_8$ clock simultaneously supports two mapping granularities: 1 byte ($C_8$) and 4 bytes ($C_{32}$). A Σ-Δ algorithm module is compatible with processing of the two mapping granularities. When the mapping granularity is $C_8$, g=1 byte and a Σ-Δ algorithm calculates, according to an obtained $C_m$ value, a mapping pattern under the $C_8$ clock, and generates a corresponding cache reading-enable indication, reads data of an LO ODU from a cache, and maps the data of the LO ODU to an ODTUCn.M payload area according to a ts-byte granularity. When the mapping granularity is $C_{32}$, g=4 bytes; first, a $C_{32}$ gap GAP control module generates a gap control signal, where the gap control signal is generated by counting a $C_8$ clock rising edge and every four rising edges generate one effective indication, and sends the gap control signal to the Σ-Δ algorithm module; the Σ-Δ algorithm calculates, according to an obtained $C_m$ value, the mapping pattern under the $C_8$ clock and in a case in which the gap control signal is effective, and generates the corresponding cache reading-enable indication, reads the data of the LO ODU from the cache, and maps the data of the LO ODU to the ODTUCn.M payload area according to a ts×4-byte granularity.

Figure 17:
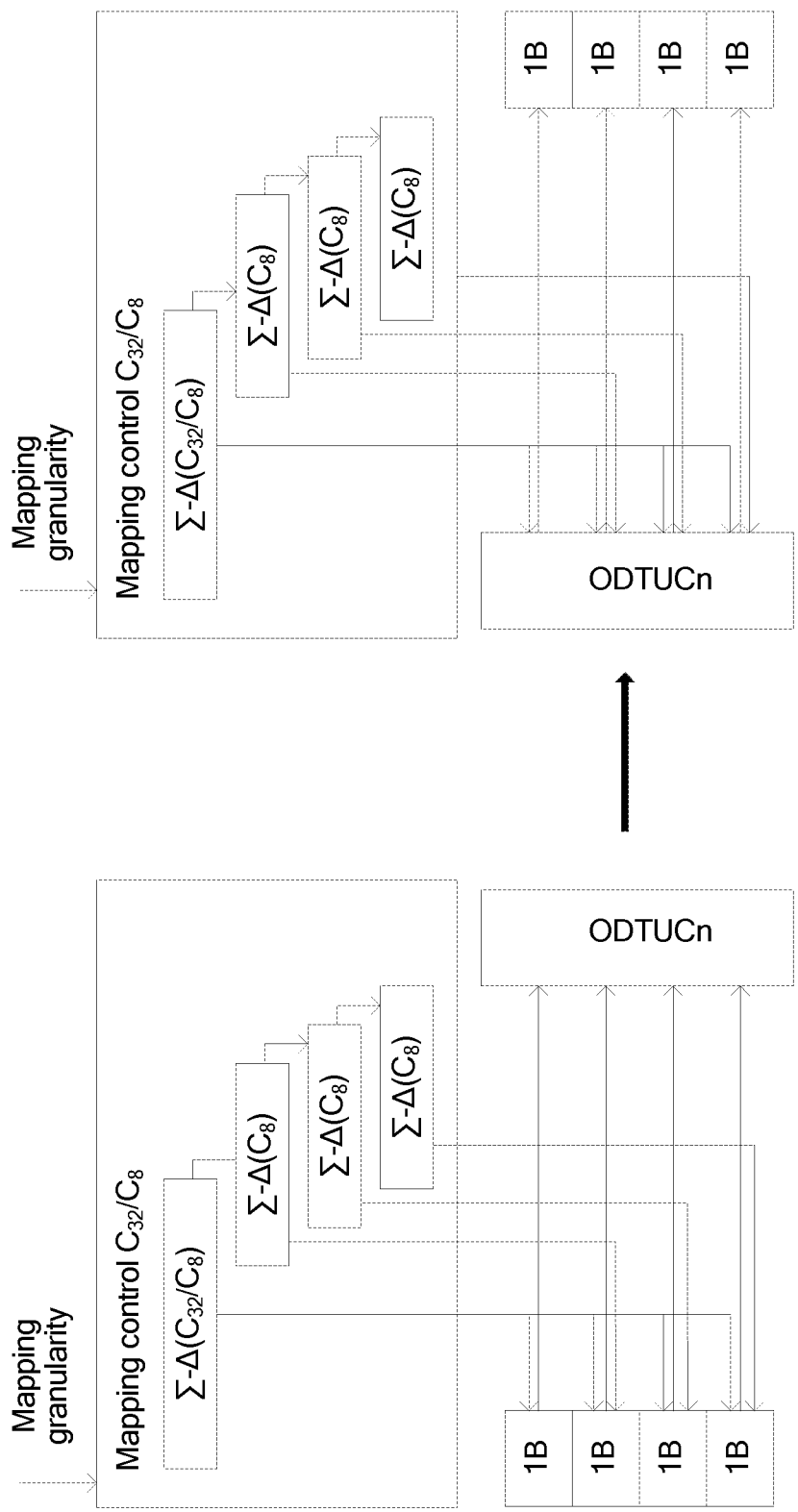
FIG. 17 is a schematic diagram of a circuit structure of a receive end and a transmit end of an optical transport network under slow-clock processing.

FIG. 17 is a schematic diagram of a circuit structure of a receive end and a transmit end of an optical transport network under slow-clock processing. As shown in FIG. 17, a $C_{32}$ clock simultaneously supports two mapping granularities: 1 byte ($C_8$) and 4 bytes (C32). Four Σ-Δ algorithm modules are compatible with processing of the two mapping granularities. When a mapping granularity is $C_{32}$, g=4 bytes, and only one of the Σ-Δ algorithm modules is used for calculation. The Σ-Δ algorithm module calculates, according to an obtained $C_m$ value, a mapping pattern under the $C_{32}$ clock, and generates a corresponding cache reading-enable indication, reads data of an LO ODU from a cache, and maps the data of the LO ODU to an ODTUCn.M payload area according to a ts×4-byte granularity. When the mapping granularity is $C_8$, g=1 byte. Four Σ-Δ algorithm modules are simultaneously used for calculation, calculate mapping patterns of current four locations respectively, and generate corresponding cache reading-enable indications respectively, read the data of the LO ODU from the cache, and map the data of the LO ODU to the ODTUCn.M payload area according to a ts-byte granularity.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A service mapping processing method for an optical transport network, comprising:
generating mapping adaptation indication information according to a mapping granularity of a low order optical channel data unit (LO ODU), wherein the mapping granularity is M×g bytes, M is a quantity of timeslots occupied by the LO ODU in an optical channel payload unit Cn (OPUCn), g is a size of a mapping granularity corresponding to each timeslot of the timeslots occupied by the LO ODU, and g is a positive integer greater than 1;
mapping the LO ODU to an payload area of an optical channel data tributary unit Cn.M (ODTUCn.M) according to the mapping adaptation indication information, wherein the ODTUCn.M comprises an overhead area and the payload area;
encapsulating the mapping adaptation indication information into the overhead area of the ODTUCn.M;
encapsulating the ODTUCn.M into an optical channel transport unit Cn (OTUCn); and
sending the OTUCn to a receive end device,
wherein the mapping adaptation indication information comprises:
a quantity $C_m$ of data entities that are of the LO ODU and are carried in the ODTUCn.M, wherein a size of the data entities is M×g bytes, and
clock information $C_{nD}$ of the LO ODU; and
wherein the generating the mapping adaptation indication information according to the mapping granularity of the LO ODU comprises:
calculating, according to the quantity M of the timeslots occupied by the LO ODU in the OPUCn, the size g of the mapping granularity corresponding to each timeslot of the timeslots occupied by the LO ODU, and a quantity of bytes of the LO ODU transmitted in an ODTUCn.M period, the quantity $C_m$ of the data entities that are of the LO ODU and are carried in the ODTUCn.M; and
calculating the clock information $C_{nD}$ of the LO ODU according to the quantity M of the timeslots occupied by the LO ODU in the OPUCn, the size g of the mapping granularity corresponding to each timeslot of the timeslots occupied by the LO ODU, and the quantity of the bytes of the LO ODU transmitted in the ODTUCn.M period.

2. The method according to claim 1, comprising:
generating another piece of mapping adaptation indication information according to a mapping granularity of another LO ODU, wherein the mapping granularity of the another LO ODU is $M_1 \times g_1$ bytes, $M_1$ is a quantity of timeslots occupied by the another LO ODU in the OPUCn, $g_1$ is a size of a mapping granularity corresponding to each timeslot of the timeslots occupied by the another LO ODU, and $g_1$ is a positive integer greater than 1, wherein $g_1$ is not equal to g;

mapping the another LO ODU to an $ODTUCn.M_1$ payload area according to the another piece of mapping adaptation indication information, wherein the $ODTUCn.M_1$ comprises an $ODTUCn.M_1$ overhead area and the $ODTUCn.M_1$ payload area;

encapsulating the another piece of mapping adaptation indication information into the $ODTUCn.M_1$ overhead area; and encapsulating the $ODTUCn.M_1$ into the OTUCn.

3. A transmit end apparatus, comprising:

a processor; and a computer readable medium having a plurality of computer executable instructions that, when executed by the processor, cause the processor to perform operations comprising:

generating mapping adaptation indication information according to a mapping granularity of a low order optical channel data unit (LO ODU), wherein the mapping granularity is M×g bytes, M is a quantity of timeslots occupied by the LO ODU in an optical channel payload unit Cn (OPUCn), g is a size of a mapping granularity corresponding to each timeslot of the timeslots occupied by the LO ODU, and g is a positive integer greater than 1;

mapping the LO ODU to an optical channel data tributary unit Cn.M (ODTUCn.M) payload area in an ODTUCn.M according to the mapping adaptation indication information, wherein the ODTUCn.M comprises an ODTUCn.M overhead area and the ODTUCn.M payload area;

encapsulating the mapping adaptation indication information into the ODTUCn.M overhead area and encapsulate the ODTUCn.M into an optical channel transport unit Cn (OTUCn); and sending the OTUCn to a receive end apparatus;

wherein the mapping adaptation indication information comprises:

a quantity $C_m$ of data entities that are of the LO ODU and are carried in the ODTUCn.M, wherein a size of the data entities is M×g bytes, and clock information $C_{nD}$ of the LO ODU; and wherein the generating the mapping adaptation indication information according to the mapping granularity of the LO ODU comprises:

calculating, according to the quantity M of the timeslots occupied by the LO ODU in the OPUCn, the size g of the mapping granularity corresponding to each timeslot of the timeslots occupied by the LO ODU, and a quantity of bytes of the LO ODU transmitted in an ODTUCn.M period, the quantity $C_m$ of the data entities that are of the LO ODU and are carried in the ODTUCn.M; and calculating the clock information $C_{nD}$ of the LO ODU according to the quantity M of the timeslots occupied by the LO ODU in the OPUCn, the size g of the mapping granularity corresponding to each timeslot of the timeslots occupied by the LO ODU, and the quantity of the bytes of the LO ODU transmitted in the ODTUCn.M period.

4. The apparatus according to claim 3, wherein the operations further comprise:

generating another piece of mapping adaptation indication information according to a mapping granularity of another LO ODU, wherein the mapping granularity of the another LO ODU is $M_1 \times g_1$ bytes, $M_1$ is a quantity of timeslots occupied by the another LO ODU in the OPUCn, $g_1$ is a size of a mapping granularity corresponding to each timeslot of the timeslots occupied by the another LO ODU, and $g_1$ is a positive integer greater than 1, wherein $g_1$ is not equal to g;

mapping the another LO ODU to an $ODTUCn.M_1$ payload area according to the another piece of mapping adaptation indication information, wherein the $ODTUCn.M_1$ comprises an $ODTUCn.M_1$ overhead area and the $ODTUCn.M_1$ payload area; and encapsulating the another piece of mapping adaptation indication information into the $ODTUCn.M_1$ overhead area; and encapsulate the $ODTUCn.M_1$ into the OTUCn.

* * * * *